United States Patent
Hartley et al.

(10) Patent No.: US 11,136,523 B2
(45) Date of Patent: Oct. 5, 2021

(54) LUBRICATING OIL COMPOSITIONS

(71) Applicant: Infineum International Limited, Abingdon (GB)

(72) Inventors: Joseph P. Hartley, Oxford (GB); Nigel A. Male, Salisbury (GB); Adam P. Marsh, Witney (GB)

(73) Assignee: INFINEUM INTERNATIONAL LIMITED

( * ) Notice: Subject to any disclaimer, the term of this patent is extended or adjusted under 35 U.S.C. 154(b) by 0 days.

(21) Appl. No.: 15/245,526

(22) Filed: Aug. 24, 2016

(65) Prior Publication Data

US 2017/0058228 A1 Mar. 2, 2017

(30) Foreign Application Priority Data

Aug. 26, 2015 (EP) ..................... 15182603

(51) Int. Cl.
| | | |
|---|---|---|
| *C10M 135/06* | (2006.01) | |
| *C10M 141/08* | (2006.01) | |
| *C10N 10/04* | (2006.01) | |
| *C10N 30/02* | (2006.01) | |
| *C10N 30/04* | (2006.01) | |
| *C10N 30/08* | (2006.01) | |
| *C10N 30/10* | (2006.01) | |
| *C10N 30/18* | (2006.01) | |
| *C10N 30/00* | (2006.01) | |
| *C10N 40/25* | (2006.01) | |

(52) U.S. Cl.
CPC ........ *C10M 135/06* (2013.01); *C10M 141/08* (2013.01); *C10M 2207/026* (2013.01); *C10M 2207/141* (2013.01); *C10M 2207/262* (2013.01); *C10M 2215/064* (2013.01); *C10M 2219/024* (2013.01); *C10M 2223/045* (2013.01); *C10M 2227/066* (2013.01); *C10M 2227/09* (2013.01); *C10N 2010/04* (2013.01); *C10N 2030/02* (2013.01); *C10N 2030/04* (2013.01); *C10N 2030/08* (2013.01); *C10N 2030/10* (2013.01); *C10N 2030/18* (2013.01); *C10N 2030/52* (2020.05); *C10N 2040/25* (2013.01); *C10N 2040/252* (2020.05); *C10N 2040/255* (2020.05)

(58) Field of Classification Search
CPC ........ C10M 2227/061; C10M 2219/02; C10M 2207/144
USPC ......................... 508/185, 518, 331
See application file for complete search history.

(56) References Cited

U.S. PATENT DOCUMENTS

2006/0052254 A1* 3/2006 Shaw .................. C10M 163/00
508/287

FOREIGN PATENT DOCUMENTS

| EP | 0237804 A2 | 9/1987 |
| EP | 1266952 A1 | 12/2002 |
| EP | 2236591 A1 | 10/2010 |

* cited by examiner

*Primary Examiner* — Vishal V Vasisth

(57) ABSTRACT

A lubricating oil composition which contains, or is made by admixing:
(A) an oil of lubricating viscosity, in a major amount;
(B) at least one oil-soluble or oil-dispersible sulfurized fatty acid ester, as an additive in an amount providing the lubricating oil composition with greater than or equal to 0.02 mass % sulphur; and,
(C) at least one oil-soluble or oil-dispersible alkali metal or alkaline earth metal salicylate detergent, as an additive in an effective minor amount, providing greater than or equal to 5 mmol of salicylate soap per kilogram of the lubricating oil composition,
wherein the lubricating oil composition does not contain a phosphorus ester additive.

7 Claims, No Drawings

LUBRICATING OIL COMPOSITIONS

FIELD OF THE INVENTION

The present invention relates to automotive lubricating oil compositions. More specifically, although not exclusively, the present invention relates to automotive crankcase lubricating oil compositions (crankcase lubricants) for use in gasoline (spark-ignited) and diesel (compression-ignited) internal combustion engines, especially for use in such engines which include a turbo-driven forced induction device e.g. a turbocharger or supercharger. The present invention also relates to the use of additives in such lubricating oil compositions to reduce and/or prevent the formation of varnish and/or deposits in such an engine lubricated with the lubricating oil composition, particularly the parts of the engine where the lubricating oil composition is subjected to extreme operating conditions of high temperatures (e.g. in excess of 300° C., particularly greater than 350° C.), particularly a turbo-driven forced induction device, such as a turbocharger or supercharger.

BACKGROUND OF THE INVENTION

A crankcase lubricant is an oil used for general lubrication in an internal combustion engine where an oil sump is situated generally below the crankshaft of the engine and to which circulated oil returns. Car manufacturers are now using turbochargers and/or superchargers more frequently with their vehicles, as it allows them to downsize the engine being used, thereby increasing fuel economy, reducing emissions whilst maintaining horsepower output.

A turbocharger typically comprises a turbine and a compressor impeller on a common shaft. The turbine is driven by exhaust gases, which in turn drives the compressor impeller which injects compressed air into the engine. The turbocharger typically includes a central hub rotating assembly (CHRA) that houses the shaft connecting the compressor impeller and turbine. The CHRA includes a bearing system which suspends the shaft, thereby allowing the shaft to rotate at extremely high speeds with minimal friction e.g. the shaft may rotate in excess of 200,000 RPM (revolutions per minute). The bearing system is lubricated with a constant supply of pressurized crankcase lubricant and the crankcase lubricant is therefore subjected to extreme operating conditions of high temperatures (e.g. in excess of 300° C., particularly in excess of 350° C., and maybe as high as 500° C.) and high pressures compared with the more moderate operating temperatures (e.g. ambient to 285° C.) associated with lubricating the other parts of the engine (e.g. pistons and crankcase). Accordingly, when an engine includes a turbocharger the crankcase lubricant is subjected to a different intense high temperature degradation process which does not occur in other parts of the engine or in engines not including a turbocharger. Breakdown and degradation of the crankcase lubricant in the turbocharger (e.g. as evidenced by the formation of varnish or deposits) may result in sluggish turbocharger response or even turbocharger failure. It is therefore essential that the crankcase lubricant exhibits the desired stability characteristics under such extreme operating conditions in an engine fitted with a turbocharger.

Accurate and efficient bench tests have therefore been developed that correlate with engine and turbocharger performance. In particular, the Thermo-Oxidation Engine Oil Simulation Test (TEOST), which measures the ability of a lubricant to resist varnish and deposit formation, now includes two separate tests: (i) TEOST 33C (ASTM D6335-09) an extremely high temperature oxidation test (i.e. the heated lubricant contacts a rod heated to temperatures up to 480° C.) simulates the extreme operating conditions which the lubricant is subjected to when lubricating a turbo-driven forced induction device, e.g. a turbocharger, and, (ii) TEOST MHT-4 (ASTM D7097-09) a "moderately high temperature" oxidation test (i.e. the lubricant at ambient temperature contacts a rod heated to a constant temperature of 285° C.) which simulates the more moderate operating conditions which the lubricant is subjected to when lubricating the "standard" parts of the engine (e.g. pistons and crankcase).

Metal detergents function both as detergents to reduce or remove deposits and as acid neutralizers or rust inhibitors. Salicylate detergents typically confer advantages in terms of piston cleanliness, TBN retention, rust control and anti-oxidancy performance. In particular, salicylate detergents have been found to provide significant credits for passing the TEOST MHT-4 test (i.e. varnish and/or deposit formation control in the parts of the engine where the lubricant is subjected to moderate operating conditions e.g. pistons and crankcase) compared with sulphonate and/or phenate detergents. However, salicylate detergents, particularly at relatively high soap levels, have been found not to perform as well in (or even fail) the TEOST 33C test (i.e. varnish and/or deposit formation control in the parts of the engine where the lubricant is subjected to extreme operating conditions of high temperatures and pressures e.g. a turbocharger) compared with sulphonate detergents. Accordingly, there is a need for a crankcase lubricating oil composition which includes a salicylate detergent that provides a strong pass in the TEOST 33C test, preferably it also passes the moderately high temperature TEOST MHT-4 test, and it is therefore suitable for use in the lubrication of an engine fitted with a turbo-driven forced induction device.

SUMMARY OF THE INVENTION

In accordance with a first aspect, the present invention provides a lubricating oil composition which comprises or is made by admixing:
(A) an oil of lubricating viscosity, in a major amount;
(B) one or more oil-soluble or oil-dispersible sulfurized fatty acid ester(s), as an additive in an amount providing the lubricating oil composition with greater than or equal to 0.02 mass % sulphur,
and,
(C) one or more oil-soluble or oil-dispersible alkali metal or alkaline earth metal salicylate detergent(s), as an additive in an effective minor amount, providing greater than or equal to 5.0 mmol of salicylate soap per kilogram of the lubricating oil composition,
wherein the lubricating oil composition does not comprise a phosphorus ester additive.

Preferably, the lubricating oil composition of the present invention is a crankcase lubricant. Suitably, the lubricating oil composition of the present invention is suitable for lubricating a turbo-driven forced induction device (i.e. turbocharger and/or supercharger, especially a turbocharger).

Unexpectedly, it has been found that the use of the oil-soluble or oil-dispersible sulfurized fatty acid ester (B) as defined in the first aspect of the present invention, as an additive in an amount providing the lubricating oil composition with greater than or equal to 0.02 mass % sulphur, in a lubricating oil composition comprising an oil of lubricating viscosity, in a major amount, and an alkali metal or alkaline earth metal salicylate detergent, as an additive in an amount providing greater than or equal to 5 mmol of salicylate soap per kilogram of the lubricating oil composition typically reduces and/or prevents the formation of high temperature deposits and/or varnish by the lubricating oil composition (i.e. due to degradation of the lubricating oil composition) when the lubricating oil composition is subjected to extreme operating conditions of high temperatures (e.g. greater than or equal to 300° C., preferably greater than or equal to 350° C., more preferably greater than or equal to 400° C., such as 350 to 500° C., particularly 400 to 500° C.), such as those temperatures associated with lubricating a turbo-driven forced induction device, for example a turbocharger. Accordingly, the lubricating oil composition as defined in the first aspect of the invention typically exhibits a pass, particularly a strong pass, in the TEOST 33C test (ASTM D6335-09) compared with a comparable lubricant not including the sulfurized fatty acid ester. Additionally, the lubricating oil composition as defined in the first aspect of the invention typically exhibits a pass, particularly a strong pass, in the TEOST MHT-4 test (ASTM D7097-09). Accordingly, the lubricating oil composition of the present invention is suitable for lubricating an engine fitted with a turbo-driven forced induction device, e.g. a turbocharger or supercharger.

In accordance with a second aspect, the present invention provides a method of lubricating a spark-ignited or compression-ignited internal combustion engine comprising lubricating the engine with a lubricating oil composition as defined in accordance with the first aspect of the present invention. Preferably, the spark-ignited or compression-ignited internal combustion engine includes a turbo-driven forced induction device, such as a turbocharger and/or supercharger (preferably a turbocharger), and the lubricating oil composition lubricates the turbo-driven forced induction device.

In accordance with a third aspect, the present invention provides the use, in the lubrication of a spark-ignited or compression-ignited internal combustion engine, of an oil-soluble or oil-dispersible sulfurized fatty acid ester (B) as defined in the first aspect of the invention, as an additive in an amount providing the lubricating oil composition with greater than or equal to 0.02 mass % sulphur, in a lubricating oil composition comprising an oil of lubricating viscosity in a major amount and an oil-soluble or oil-dispersible alkali metal or alkaline earth metal salicylate detergent (C) as defined in the first aspect of the present invention, as an additive in an effective minor amount, providing greater than or equal to 5 mmol of salicylate soap per kilogram of the lubricating oil composition, to reduce and/or prevent the formation of high temperature deposits and/or varnish by the lubricating oil composition (i.e. due to degradation of the lubricating oil composition) on the engine components during operation of the engine wherein the lubricating oil composition is subjected to temperatures of greater than or equal to 300° C., preferably greater than or equal to 350° C., more preferably greater than or equal to 400° C., such as 350 to 500° C., particularly 400 to 500° C.

In accordance with a fourth aspect, the present invention provides the use of a lubricating oil composition as defined in accordance with the first aspect of the invention, in the lubrication of a spark-ignited or compression-ignited internal combustion engine, to reduce and/or prevent the formation of high temperature deposits and/or varnish by the lubricating oil composition (i.e. due to degradation of the lubricating oil composition) on the engine components during operation of the engine wherein the lubricating oil composition is subjected to temperatures of greater than or equal to 300° C., preferably greater than or equal to 350° C., more preferably greater than or equal to 400° C., such as 350 to 500° C., particularly 400 to 500° C.

In accordance with a fifth aspect, the present invention provides a method of reducing and/or preventing the formation of high temperature deposits and/or varnish on the engine components of a spark-ignited or compression-ignited internal combustion engine by a lubricating oil composition (i.e. due to degradation of the lubricating oil composition), the method comprising lubricating the engine with a lubricating oil composition as defined in accordance with the first aspect of the invention wherein the lubricating oil composition is subjected to temperatures of greater than or equal to 300° C., preferably greater than or equal to 350° C., more preferably greater than or equal to 400° C., such as 350 to 500° C., particularly 400 to 500° C.

Suitably, the spark-ignited or compression-ignited internal combustion engine of the second, third, fourth and fifth aspects of the present invention includes a turbo-driven forced induction device, such as a turbocharger and/or supercharger (preferably a turbocharger), and the lubricating oil composition lubricates the turbo-driven forced induction device during operation of the engine. Accordingly, the method and uses according to the second to fifth aspects of the invention reduce and/or prevent the formation of high temperature deposits and/or varnish by the lubricating oil composition (i.e. due to degradation of the lubricating oil composition) in the lubrication of a turbo-driven forced induction device during operation of the engine i.e. reduce and/or prevent the formation of high temperature deposits and/or varnish on the component parts of the turbo-driven induction device during operation of the engine.

Preferably, the engine as defined in the second, third, fourth and fifth aspects of the present invention is a spark-ignited internal combustion engine.

In accordance with a sixth aspect, the present invention provides the use of an oil-soluble or oil-dispersible sulfurized fatty acid ester (B) as defined in the first aspect of the invention, as an additive in an amount providing the lubricating oil composition with greater than or equal to 0.02 mass % sulphur, in a lubricating oil composition comprising an oil of lubricating viscosity in a major amount and an oil-soluble or oil-dispersible alkali metal or alkaline earth metal salicylate detergent (C) as defined in the first aspect of the present invention, as an additive in an effective minor amount, providing greater than or equal to 5 mmol of salicylate soap per kilogram of the lubricating oil composition, to reduce and/or prevent the formation of high temperature deposits and/or varnish by the lubricating oil composition as measured by the TEOST 33C test (ASTM D6335-09). Suitably, the use of the oil-soluble or oil-dispersible sulfurized fatty acid ester (B) as defined herein permits the lubricating oil composition as defined in the sixth aspect to pass the TEOST 33C test (ASTM D6335-09).

Suitably, the use of the oil-soluble or oil-dispersible sulfurized fatty acid ester (B) as defined herein permits the lubricating oil composition as defined in the sixth aspect to pass the TEOST MHT-4 test (ASTM D7097-09).

The one or more sulfurized fatty acid ester(s) (B) provides the lubricating oil composition of the first aspect of the present invention and the lubricating oil composition as defined in the second, third, fourth, fifth and sixth aspects of the present invention with greater than or equal to 0.02, preferably greater than or equal to 0.05, more preferably greater than or equal to 0.08, mass % sulphur, based on the total mass of the lubricating oil composition. Preferably, the one or more sulfurized fatty acid ester(s) provides the lubricating oil composition of the first aspect of the present invention and the lubricating oil composition as defined in the second, third, fourth, fifth and sixth aspects of the present invention with less than or equal to 0.30, preferably less than or equal to 0.25, more preferably less than or equal to 0.20, more preferably less than or equal to 0.15, mass % sulphur, based on the total mass of the lubricating oil composition.

Preferably, the one or more oil-soluble or oil-dispersible alkali metal or alkaline earth metal salicylate detergent(s) (C) provides the lubricating oil composition with greater than or equal to 5.5, more preferably greater than or equal to 6.0, mmol of salicylate soap per kilogram of the lubricating oil composition. Preferably, the one or more oil-soluble or oil-dispersible alkali metal or alkaline earth metal salicylate detergent(s) (C) as defined herein provides the lubricating oil composition with less than or equal to 20, more preferably less than or equal 18, most preferably less than or equal to 15, mmol of salicylate soap per kilogram of the lubricating oil composition.

Preferably, the one or more alkali or alkaline earth metal salicylate detergent(s) (C) in the lubricating oil composition of the first aspect of the present invention and as defined in the second, third, fourth, fifth and sixth aspects of the present invention are the sole metal containing detergent(s) which are present in the lubricating oil composition (i.e. the only metal containing detergents which are present in the lubricating oil composition are the one or more alkali or alkaline earth metal salicylate detergent(s)). More preferably, the only metal containing detergents which are present in the lubricating oil composition are the one or more alkali or alkaline earth metal salicylate detergent(s).

The lubricating oil composition of the first aspect of the present invention and as defined in the second, third, fourth, fifth and sixth aspects of the present invention may further include an oil-soluble or oil-dispersible organo-molybdenum (D) compound as defined herein. Suitably, when present, the organo-molybdenum compound provides the lubricating oil composition with at least 5, such as at least 20, or at least 40, preferably at least 60 ppm pf molybdenum, based on the total mass of the lubricating oil composition. When present, the organo molybdenum compound provides the lubricating oil composition with less than or equal to 1200, such as less than or equal to 1000, or less than or equal to 750 or less than or equal to 500, or less than or equal to 200 ppm of molybdenum, based on the total mass of the lubricating oil composition. Although the presence of an organo-molybdenum compound may be beneficial, it is not essential. Thus, in an alternative preferred embodiment the lubricating oil composition of the first aspect of the present invention and as defined in the second, third, fourth, fifth and sixth aspects of the present invention does not include any molybdenum.

The lubricating oil composition of the first aspect of the present invention and as defined in the second, third, fourth, fifth and sixth aspects of the present invention may further include an oil-soluble or oil-dispersible ashless anti-oxidant (E), comprising an aminic antioxidant, such as an aromatic amine anti-oxidant, a phenolic anti-oxidant, such as a hinder phenol ester, or a combination thereof, as an additive in an effective minor amount. If present the ashless antioxidant (E) preferably includes an aromatic amine anti-oxidant. The ashless anti-oxidant (E), or total amount of such anti-oxidants, is suitably present in an amount of 0.1 to 5.0, preferably 0.25 to 2.0, mass %, based on the total mass of the lubricating oil composition.

Preferably, the lubricating oil composition of the first aspect of the present invention and as defined in the second, third, fourth, fifth and sixth aspects of the present invention further includes a dihydrocarbyl dithiophosphate metal salt (e.g. ZDDP), as an additive component in an effective minor amount. Suitably, the dihydrocarbyl dithiophosphate metal salt (e.g. ZDDP) is added to the lubricating oil compositions in amounts sufficient to provide no greater than 1200 ppm, preferably no greater than 1000 ppm, more preferably no greater than 900 ppm, most preferably no greater than 850 ppm of phosphorous, based on the total mass of the lubricating oil composition, and as measured in accordance with ASTM D5185. Suitably, the dihydrocarbyl dithiophosphate metal salt (e.g. ZDDP) is added to the lubricating oil compositions in amounts sufficient to provide at least 100 ppm, preferably at least 350 ppm, more preferably at least 500 ppm of phosphorous, based on the total mass of the lubricating oil composition, and as measured in accordance with ASTM D5185.

Preferably, the lubricating oil composition of the first aspect of the present invention and as defined in the second, third, fourth, fifth and sixth aspects of the present invention may optionally further include an ashless dispersant. The ashless dispersant may be a borated ashless dispersant providing the lubricating oil composition with at least 10, such as at least 30, for example, at least 50 or even at least 70 ppm of boron, based on the total mass of the lubricating oil composition. If present, the borated ashless dispersant suitably provides no more than 1000, preferably no more than 750, more preferably no more than 500 ppm of boron to the lubricating oil composition, based on the total mass of the lubricating oil composition.

Preferably, the lubricating oil composition of the first aspect of the present invention and as defined in the second, third, fourth, fifth and sixth aspects of the present invention further includes one or more co-additives in an effective minor amount (e.g. 0.1 to 30 mass %), other than additive components (B) and (C), selected from metal detergents, corrosion inhibitors, antioxidants, pour point depressants, antiwear agents, friction modifiers, demulsifiers, antifoam agents and viscosity modifiers.

Suitably, the lubricating oil composition of the present invention has a sulphated ash content of less than or equal to 1.2, preferably less than or equal to 1.1, more preferably less than or equal to 1.0, mass % (ASTM D874) based on the total mass of the composition.

Preferably, the lubricating oil composition of the present invention contains low levels of phosphorus. Suitably, the lubricating oil composition contains phosphorus in an amount of less than or equal to 0.12, preferably up to 0.11, more preferably less than or equal to 0.10, even more preferably less than or equal to 0.09, even more preferably less than or equal to 0.08, most preferably less than or equal to 0.06, mass % of phosphorus (ASTM D5185) based on the total mass of the composition. Suitably, the lubricating oil composition contains phosphorus in an amount of greater than or equal to 0.01, preferably greater than or equal to 0.02, more preferably greater than or equal to 0.03, even more preferably greater than or equal to 0.05, mass % of phosphorus (ASTM D5185) based on the total mass of the composition.

Typically, the lubricating oil composition may contain low levels of sulphur. Preferably, the lubricating oil composition contains sulphur in an amount of up to 0.4, more preferably up to 0.3, even more preferably up to 0.2, mass % sulphur (ASTM D2622) based on the total mass of the composition.

Typically, a lubricating oil composition according to the present invention contains up to 0.30, more preferably up to 0.20, most preferably up to 0.15, mass % nitrogen, based on the total mass of the composition and as measured according to ASTM method D5291.

Suitably, the lubricating oil composition may have a total base number (TBN), as measured in accordance with ASTM D2896, of from 4 to 15, preferably from 5 to 12 mg KOH/g.

In this specification, the following words and expressions, if and when used, have the meanings given below:

"active ingredients" or "(a.i.)" refers to additive material that is not diluent or solvent;

"comprising" or any cognate word specifies the presence of stated features, steps, or integers or components, but does not preclude the presence or addition of one or more other features, steps, integers, components or groups thereof. The expressions "consists of" or "consists essentially of" or cognates may be embraced within "comprises" or cognates, wherein "consists essentially of" permits inclusion of substances not materially affecting the characteristics of the composition to which it applies;

"hydrocarbyl" means a chemical group of a compound that contains hydrogen and carbon atoms and that is bonded to the remainder of the compound directly via a carbon atom. The group may contain one or more atoms other than carbon and hydrogen provided they do not affect the essentially hydrocarbyl nature of the group. Those skilled in the art will be aware of suitable groups (e.g., halo, especially chloro and fluoro, amino, alkoxyl, mercapto, alkylmercapto, nitro, nitroso, sulfoxy, etc.). Preferably, the group consists essentially of hydrogen and carbon atoms, unless specified otherwise. Preferably, the hydrocarbyl group is a $C_1$ to $C_{30}$ hydrocarbyl group, more preferably an aliphatic hydrocarbyl group, such as a $C_1$ to $C_{30}$ aliphatic hydrocarbyl group. The term "hydrocarbyl" includes "alkyl", "alkenyl" and "aryl" as defined herein;

"alkyl" means a $C_1$ to $C_{30}$ alkyl group, preferably a $C_1$ to $C_6$ alkyl group, which is bonded to the remainder of the compound directly via a single carbon atom. Unless otherwise specified, alkyl groups may, when there are a sufficient number of carbon atoms, be linear (i.e. unbranched) or branched, be cyclic, acyclic or part cyclic/acyclic. Preferably, the alkyl group comprises a linear or branched acyclic alkyl group. Representative examples of alkyl groups include, but are not limited to, methyl, ethyl, n-propyl, iso-propyl, n-butyl, sec-butyl, iso-butyl, tert-butyl, n-pentyl, iso-pentyl, neo-pentyl, hexyl, heptyl, octyl, dimethyl hexyl, nonyl, decyl, undecyl, dodecyl, tridecyl, tetradecyl, pentadecyl, hexadecyl, heptadecyl, octadecyl, nonadecyl, icosyl and triacontyl;

"alkenyl" means a $C_2$ to $C_{30}$, preferably a $C_2$ to $C_{12}$, group which includes at least one carbon to carbon double bond and is bonded to the remainder of the compound directly via a single carbon atom, and is otherwise defined as "alkyl";

"aryl" means a $C_6$ to $C_{18}$, preferably $C_6$ to $C_{10}$, aromatic group, optionally substituted by one or more alkyl groups, halo, hydroxyl, alkoxy and amino groups, which is bonded to the remainder of the compound directly via a single carbon atom. Preferred aryl groups include phenyl and naphthyl groups and substituted derivatives thereof, especially phenyl and alkyl substituted derivatives thereof;

"monocarboxylic acid" means a hydrocarbyl monocarboxylic acid which includes only one carboxylic acid functional group;

"fatty acid" means a monocarboxylic acid having a $C_5$ to $C_{29}$, preferably $C_7$ to $C_{29}$, more preferably a $C_9$ to $C_{27}$, most preferably a $C_{11}$ to $C_{23}$ aliphatic hydrocarbyl chain. Such compounds may be referred to herein as $C_5$ to $C_{29}$, preferably $C_7$ to $C_{29}$, more preferably $C_9$ to $C_{27}$, most preferably $C_{11}$ to $C_{23}$ aliphatic hydrocarbyl monocarboxylic acid(s)/aliphatic hydrocarbyl fatty acid(s) (wherein $C_x$ to $C_y$ designates the total number of carbon atoms in the aliphatic hydrocarbyl chain of the fatty acid, the fatty acid itself due to the presence of the carboxyl carbon atom includes a total of $C_{x+1}$ to $C_{y+1}$ carbon atoms). Preferably, the aliphatic hydrocarbyl fatty acid, inclusive of the carboxyl carbon atom, has an even number of carbon atoms. The aliphatic hydrocarbyl chain of the fatty acid may be saturated or unsaturated (i.e. includes at least one carbon to carbon double bond); preferably, the aliphatic hydrocarbyl chain is unsaturated and includes at least one carbon to carbon double bond—such fatty acids may be obtained from natural sources (e.g. derived from animal or vegetable oils) and/or by reduction of the corresponding saturated fatty acid. However, at least a proportion of the aliphatic hydrocarbyl chain(s) of the corresponding fatty acid ester(s) is unsaturated (i.e. includes at least one carbon to carbon double bond) to permit reaction with sulphur to form the sulfurized fatty acid ester, "fatty acid ester" means a fatty acid as defined herein wherein the monocarboxylic acid functional group of the fatty acid has been converted into an ester group. Suitably, the monocarboxylic acid functional group of the fatty acid is converted to a hydrocarbyl ester, preferably a $C_1$ to $C_{30}$ aliphatic hydrocarbyl ester, such as an alkyl ester, preferably a $C_1$ to $C_6$ alkyl ester, especially a methyl ester. Alternatively, or additionally, the monocarboxylic acid functional group of the fatty acid may be in the form of the natural glycerol ester. Accordingly, the term "fatty acid ester" embraces a fatty acid glycerol ester and a fatty acid $C_1$ to $C_{30}$ aliphatic hydrocarbyl ester, (e.g. a fatty acid alkyl ester, more preferably a fatty acid $C_1$ to $C_6$ alkyl ester, especially a fatty acid methyl ester). Suitably, the term "fatty acid ester" embraces a $C_5$ to $C_{29}$, preferably $C_7$ to $C_{29}$, more preferably $C_9$ to $C_{27}$, most preferably $C_{11}$ to $C_{23}$ aliphatic hydrocarbyl monocarboxylic acid(s)/aliphatic hydrocarbyl fatty acid(s) glycerol ester and a $C_5$ to $C_{29}$, preferably $C_7$ to $C_{29}$, more preferably $C_9$ to $C_{27}$, most preferably $C_{11}$ to $C_{23}$ aliphatic hydrocarbyl monocarboxylic acid(s)/aliphatic hydrocarbyl fatty acid(s) $C_1$ to $C_{30}$ aliphatic hydrocarbyl ester. Suitably, to permit sulfurization of the fatty acid ester a proportion of the aliphatic hydrocarbyl chain of the fatty acid ester is unsaturated and includes at least one carbon to carbon double bond;

"sulfurized fatty acid ester" means a compound obtained by sulphurizing a fatty acid ester as defined herein. Suitably, the sulfurized fatty acid ester is ashless;

"salicylate soap" means the amount of alkali metal or alkaline earth metal salicylate salt contributed by the one or more alkali metal or alkaline earth metal salicylate detergent(s) exclusive of any overbasing material;

"alkali metal or alkaline earth metal salicylate detergent" includes salicylate soap as defined herein and any overbasing material;

"halo" or "halogen" includes fluoro, chloro, bromo and iodo;

"oil-soluble" or "oil-dispersible", or cognate terms, used herein do not necessarily indicate that the compounds or additives are soluble, dissolvable, miscible, or are capable of being suspended in the oil in all proportions. These do mean, however, that they are, for example, soluble or stably dispersible in oil to an extent sufficient to exert their intended effect in the environment in which the oil is employed. Moreover, the additional incorporation of other additives may also permit incorporation of higher levels of a particular additive, if desired;

"ashless" in relation to an additive means the additive does not include a metal;

"ash-containing" in relation to an additive means the additive includes a metal;

"major amount" means in excess of 50 mass % of a composition expressed in respect of the stated component and in respect of the total mass of the composition, reckoned as active ingredient of the component;

"minor amount" means less than 50 mass % of a composition, expressed in respect of the stated additive and in respect of the total mass of the composition, reckoned as active ingredient of the additive;

"effective minor amount" in respect of an additive means a minor amount of such an additive in a lubricating oil composition so that the additive provides the desired technical effect;

"ppm" means parts per million by mass, based on the total mass of the lubricating oil composition;

"metal content" of the lubricating oil composition or of an additive component, for example molybdenum content or total metal content of the lubricating oil composition (i.e. the sum of all individual metal contents), is measured by ASTM D5185;

"TBN" in relation to an additive component or of a lubricating oil composition of the present invention, means total base number (mg KOH/g) as measured by ASTM D2896;

"$KV_{100}$" means kinematic viscosity at 100° C. as measured by ASTM D445;

"phosphorus content" is measured by ASTM D5185;

"sulfur content" is measured by ASTM D2622; and,

"sulfated ash content" is measured by ASTM D874.

All percentages reported are mass % on an active ingredient basis, i.e. without regard to carrier or diluent oil, unless otherwise stated.

Also, it will be understood that various components used, essential as well as optimal and customary, may react under conditions of formulation, storage or use and that the invention also provides the product obtainable or obtained as a result of any such reaction.

Further, it is understood that any upper and lower quantity, range and ratio limits set forth herein may be independently combined. Accordingly, any upper and lower quantity, range and ratio limits set forth herein associated with a particular technical feature of the present invention may be independently combined with any upper and lower quantity, range and ratio limits set forth herein associated with one or more other particular technical feature(s) of the present invention. Furthermore, any particular technical feature of the present invention, and all preferred variants thereof, may be independently combined with any other particular technical feature(s), and all preferred variants thereof.

Also, it will be understood that the preferred features of each aspect of the present invention are regarded as preferred features of every other aspect of the present invention.

DETAILED DESCRIPTION OF THE INVENTION

The features of the invention relating, where appropriate, to each and all aspects of the invention, will now be described in more detail as follows:

Oil of Lubricating Viscosity (A)

The oil of lubricating viscosity (sometimes referred to as "base stock" or "base oil") is the primary liquid constituent of a lubricant, into which additives and possibly other oils are blended, for example to produce a final lubricant (or lubricant composition). A base oil is useful for making concentrates as well as for making lubricating oil compositions therefrom, and may be selected from natural (vegetable, animal or mineral) and synthetic lubricating oils and mixtures thereof.

The base stock groups are defined in the American Petroleum Institute (API) publication "Engine Oil Licensing and Certification System", Industry Services Department, Fourteenth Edition, December 1996, Addendum 1, December 1998. Typically, the base stock will have a viscosity preferably of 3-12, more preferably 4-10, most preferably 4.5-8, $mm^2/s$ (cSt) at 100° C.

Definitions for the base stocks and base oils in this invention are the same as those found in the American Petroleum Institute (API) publication "Engine Oil Licensing and Certification System", Industry Services Department, Fourteenth Edition, December 1996, Addendum 1, December 1998. Said publication categorizes base stocks as follows:

a) Group I base stocks contain less than 90 percent saturates and/or greater than 0.03 percent sulphur and have a viscosity index greater than or equal to 80 and less than 120 using the test methods specified in Table E-1.

b) Group II base stocks contain greater than or equal to 90 percent saturates and less than or equal to 0.03 percent sulphur and have a viscosity index greater than or equal to 80 and less than 120 using the test methods specified in Table E-1.

c) Group III base stocks contain greater than or equal to 90 percent saturates and less than or equal to 0.03 percent sulphur and have a viscosity index greater than or equal to 120 using the test methods specified in Table E-1.

d) Group IV base stocks are polyalphaolefins (PAO).

e) Group V base stocks include all other base stocks not included in Group I, III, or IV.

TABLE E-1

Analytical Methods for Base Stock

| Property | Test Method |
|---|---|
| Saturates | ASTM D 2007 |
| Viscosity Index | ASTM D 2270 |
| Sulphur | ASTM D 2622 |
|  | ASTM D 4294 |
|  | ASTM D 4927 |
|  | ASTM D 3120 |

Other oils of lubricating viscosity which may be included in the lubricating oil composition are detailed as follows:

Natural oils include animal and vegetable oils (e.g. castor and lard oil), liquid petroleum oils and hydrorefined, solvent-treated mineral lubricating oils of the paraffinic, naphthenic and mixed paraffinic-naphthenic types. Oils of lubricating viscosity derived from coal or shale are also useful base oils.

Synthetic lubricating oils include hydrocarbon oils such as polymerized and interpolymerized olefins (e.g. polybutylenes, polypropylenes, propylene-isobutylene copolymers, chlorinated polybutylenes, poly(1-hexenes), poly(1-octenes), poly(1-decenes)); alkylbenzenes (e.g. dodecylbenzenes, tetradecylbenzenes, dinonylbenzenes, di(2-ethylhexyl)benzenes); polyphenols (e.g. biphenyls, terphenyls, alkylated polyphenols); and alkylated diphenyl ethers and alkylated diphenyl sulfides and the derivatives, analogues and homologues thereof.

Another suitable class of synthetic lubricating oils comprises the esters of dicarboxylic acids (e.g. phthalic acid, succinic acid, alkyl succinic acids and alkenyl succinic acids, maleic acid, azelaic acid, suberic acid, sebasic acid, fumaric acid, adipic acid, linoleic acid dimer, malonic acid, alkylmalonic acids, alkenyl malonic acids) with a variety of alcohols (e.g. butyl alcohol, hexyl alcohol, dodecyl alcohol, 2-ethylhexyl alcohol, ethylene glycol, diethylene glycol monoether, propylene glycol). Specific examples of these esters include dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, and the complex ester formed by reacting one mole of sebacic acid with two moles of tetraethylene glycol and two moles of 2-ethylhexanoic acid.

Esters useful as synthetic oils also include those made from $C_5$ to $C_{12}$ monocarboxylic acids and polyols, and polyol ethers such as neopentyl glycol, trimethylolpropane, pentaerythritol, dipentaerythritol and tripentaerythritol.

Unrefined, refined and re-refined oils can be used in the compositions of the present invention. Unrefined oils are those obtained directly from a natural or synthetic source without further purification treatment. For example, a shale oil obtained directly from retorting operations, a petroleum oil obtained directly from distillation or ester oil obtained directly from an esterification process and used without further treatment would be unrefined oil. Refined oils are similar to the unrefined oils except they have been further treated in one or more purification steps to improve one or more properties. Many such purification techniques, such as distillation, solvent extraction, acid or base extraction, filtration and percolation are known to those skilled in the art. Re-refined oils are obtained by processes similar to those used to obtain refined oils applied to refined oils which have been already used in service. Such re-refined oils are also known as reclaimed or reprocessed oils and often are additionally processed by techniques for approval of spent additive and oil breakdown products.

Other examples of base oil are gas-to-liquid ("GTL") base oils, i.e. the base oil may be an oil derived from Fischer-Tropsch synthesised hydrocarbons made from synthesis gas containing $H_2$ and CO using a Fischer-Tropsch catalyst. These hydrocarbons typically require further processing in order to be useful as a base oil. For example, they may, by methods known in the art, be hydroisomerized; hydrocracked and hydroisomerized; dewaxed; or hydroisomerized and dewaxed.

Whilst the composition of the base oil will depend upon the particular application of the lubricating oil composition and the oil formulator will chose the base oil to achieve desired performance characteristics at reasonable cost, the base oil of a lubricating oil composition according to the present invention typically comprises no more than 85 mass % Group IV base oil, the base oil may comprise no more than 70 mass % Group IV base oil, or even no more than 50 mass % Group IV base oil. The base oil of a lubricating oil composition according to the present invention may comprise 0 mass % Group IV base oil. Alternatively, the base oil of a lubricating oil composition according to the present invention may comprise at least 5 mass %, at least 10 mass % or at least 20 mass % Group IV base oil. The base oil of a lubricating oil composition according to the present invention may comprise from 0 to 85 mass %, or from 5-85 mass %, alternatively from 10-85 mass % Group IV base oil.

Preferably, the volatility of the oil of lubricating viscosity or oil blend, as measured by the NOACK test (ASTM D5800), is less than or equal to 20%, preferably less than or equal to 16%, preferably less than or equal to 12%, more preferably less than or equal to 10%. Preferably, the viscosity index (VI) of the oil of lubricating viscosity is at least 95, preferably at least 110, more preferably up to 120, even more preferably at least 120, even more preferably at least 125, most preferably from about 130 to 140.

The oil of lubricating viscosity is provided in a major amount, in combination with a minor amount of additive components (B) and (C), as defined herein and, if necessary, one or more co-additives, such as described hereinafter, constituting a lubricating oil composition. This preparation may be accomplished by adding the additives directly to the oil or by adding them in the form of a concentrate thereof to disperse or dissolve the additive. Additives may be added to the oil by any method known to those skilled in the art, either before, at the same time as, or after addition of other additives.

Preferably, the oil of lubricating viscosity is present in an amount of greater than 55 mass %, more preferably greater than 60 mass %, even more preferably greater than 65 mass %, based on the total mass of the lubricating oil composition. Preferably, the oil of lubricating viscosity is present in an amount of less than 98 mass %, more preferably less than 95 mass %, even more preferably less than 90 mass %, based on the total mass of the lubricating oil composition.

When concentrates are used to make the lubricating oil compositions, they may for example be diluted with 3 to 100, e.g. 5 to 40, parts by mass of oil of lubricating viscosity per part by mass of the concentrate.

Preferably, the lubricating oil composition is a multigrade oil identified by the viscometric descriptor SAE 20WX, SAE 15WX, SAE 10WX, SAE 5WX or SAE 0WX, where X represents any one of 20, 30, 40 and 50; the characteristics of the different viscometric grades can be found in the SAE 3300 classification. In an embodiment of each aspect of the invention, independently of the other embodiments, the lubricating oil composition is in the form of an SAE 10WX, SAE 5WX or SAE 0WX, preferably in the form of a SAE 5WX or SAE 0WX, wherein X represents any one of 20, 30, 40 and 50. Preferably X is 20 or 30.

Sulfurized Fatty Acid Ester (B)

The sulfurized fatty acid ester is derived from sulfurizing a fatty acid ester. Suitably, to permit sulfurization of the fatty acid ester a proportion of the hydrocarbyl chain of the fatty acid ester (e.g. $C_5$ to $C_{29}$ aliphatic hydrocarbyl fatty acid ester) is unsaturated and includes at least one carbon to carbon double bond.

The fatty acid ester may be derived from any suitable fatty acid. Typically, the fatty acid is obtained from a natural source, for example, fatty acids may be obtained from hydrolysis of fatty acid triglycerides which are obtainable from animal or vegetable oils. The fatty acid may then be esterified to form the corresponding fatty acid ester which is subsequently sulfurized by reaction with sulphur. Alternatively, or additionally, fatty acid triglycerides may be sulfurized directly to form the corresponding sulfurized fatty acid triglyceride or fatty acid triglycerides may be trans-esterified to form a different fatty acid ester which is subsequently sulfurized by reaction with sulphur.

Suitable fatty acids from which the fatty acid ester and subsequent sulfurized fatty acid ester may be derived include one or more of $C_5$ to $C_{29}$, preferably $C_7$ to $C_{29}$, more preferably $C_9$ to $C_{27}$, most preferably $C_{11}$ to $C_{23}$ aliphatic hydrocarbyl monocarboxylic acid(s)/aliphatic hydrocarbyl fatty acid(s) (wherein $C_x$ to $C_y$ designates the total number of carbon atoms in the aliphatic hydrocarbyl chain of the fatty acid, the fatty acid itself due to the presence of the carboxyl carbon atom includes a total of $C_{x+1}$ to $C_{y+1}$ carbon atoms). Preferably, the total number of carbon atoms in the fatty acid is an even number. Suitably, the aliphatic hydrocarbyl chain of the alphatic hydrocarbyl fatty acid may be saturated or unsaturated (i.e. including at least one carbon to carbon double bond). Preferably, a proportion of the aliphatic hydrocarbyl chain(s) of the one or more aliphatic hydrocarbyl fatty acid(s) includes at least one carbon to carbon double bond. Preferred fatty acids, from which the sulfurized fatty acid ester may be ultimately derived, include one or more of myristoleic acid, palmitoleic acid, sapienic acid, hexadecatrienoic acid, oleic acid, stearidonic acid, elaidic acid, vaccenic acid, linoleic acid, linoelaidic acid, linolenic acid, arachidonic acid, eicosapentaenoic acid, eicosenoic acid, erucic acid, docosahexaenoic acid, docosahexaenoic acid, tetracosapentaenoic acid and tetracosatetraenoic acid. More preferred fatty acids, from which the sulfurized fatty acid ester may be derived, include one or more of oleic acid, linoleic acid and linolenic acid.

The one or more fatty acid(s) is esterified to form the corresponding fatty acid ester(s), preferably a fatty acid hydrocarbyl ester, preferably a fatty acid $C_1$ to $C_{30}$ aliphatic hydrocarbyl ester, such as a fatty acid alkyl ester, preferably a fatty acid $C_1$ to $C_6$ alkyl ester, especially a fatty acid methyl ester. Accordingly, suitable fatty acid esters include one or more of $C_5$ to $C_{29}$, preferably $C_7$ to $C_{29}$, more preferably $C_9$ to $C_{27}$, most preferably C), to $C_{23}$ aliphatic hydrocarbyl fatty acid hydrocarbyl ester(s); more preferred fatty acid esters include one or more of $C_5$ to $C_{29}$, preferably $C_7$ to $C_{29}$, more preferably $C_9$ to $C_{27}$, most preferably $C_{11}$ to $C_{23}$ aliphatic hydrocarbyl fatty acid $C_1$ to $C_{30}$ aliphatic hydrocarbyl ester(s); even more preferred fatty acid esters include $C_5$ to $C_{29}$, preferably $C_7$ to $C_{29}$, more preferably $C_9$ to $C_{27}$, most preferably $C_{11}$ to $C_{23}$ aliphatic hydrocarbyl fatty acid $C_1$ to $C_{30}$ alkyl ester(s); even more preferred fatty acid esters include $C_5$ to $C_{29}$, preferably $C_7$ to $C_{29}$, more preferably $C_9$ to $C_{27}$, most preferably $C_{11}$ to $C_{23}$ aliphatic hydrocarbyl fatty acid $C_1$ to $C_6$ alkyl ester(s); even more preferred fatty acid esters include $C_5$ to $C_{29}$, preferably $C_7$ to $C_{29}$, more preferably $C_9$ to $C_{27}$, most preferably C)) to $C_{23}$ aliphatic hydrocarbyl fatty acid methyl ester(s). Accordingly, a proportion of the aliphatic hydrocarbyl chain(s) of the one or more aliphatic hydrocarbyl fatty acid ester(s) include at least one carbon to carbon double bond.

Additionally, or alternatively, the fatty acid ester may be in the form of a fatty acid glycerol ester. Suitably, fatty acid ester(s) may also include $C_5$ to $C_{29}$, preferably $C_7$ to $C_{29}$, more preferably $C_9$ to $C_{27}$, most preferably C)) to $C_{23}$ aliphatic hydrocarbyl fatty acid glycerol ester(s).

Suitably, the fatty acid ester may be obtained directly from natural sources e.g. vegetable and/or animal oils. Such fatty acids may already be in the form of a fatty acid glycerol ester. The fatty acid glycerol ester may be sulfurized directly to form the corresponding sulfurized fatty acid glycerol ester. Additionally, or alternatively, the fatty acid glycerol ester may be trans-esterified to form a fatty acid hydrocarbyl ester (e.g. fatty acid methyl ester) as defined hereinbefore, prior to being sulfurized to form the fatty acid ester.

Accordingly, a proportion of the aliphatic hydrocarbyl chain(s) of the one or more fatty acid ester(s) (i.e. aliphatic hydrocarbyl fatty acid ester(s)), as defined herein, include at least one carbon to carbon double bond to permit sulfurization by reaction with sulphur.

The sulfurized fatty acid ester may be derived from any suitable fatty acid ester, but is preferably derived from a vegetable oil (e.g. glycerol ester or trans-esterification product), such as, but not limited to, one or more of palm oil, corn oil, grapeseed oil, coconut oil, cottonseed oil, wheatgerm oil, soya oil, safflower oil, olive oil, peanut oil, rapeseed oil and sunflower oil, or an animal oil (e.g. glycerol ester or trans-esterification product) such as tallow oil or lard oil. The sulfurized fatty acid ester is preferably derived from one or more of palm oil, rapeseed oil, soya oil, tallow oil, lard oil, or a trans-esterified product thereof. More preferably, the sulfurized fatty acid ester is derived from a vegetable oil, especially one or more of palm oil, soya oil, rapeseed oil, or a trans-esterified product thereof. The sulfurized fatty acid ester suitably comprises substantially only sulfurized fatty acid ester and no other sulfurized carboxylic acid ester.

Accordingly, the one or more sulfurized fatty acid ester(s) include one or more sulphurized $C_5$ to $C_{29}$, preferably $C_7$ to $C_{29}$, more preferably $C_9$ to $C_{27}$, most preferably $C_{11}$ to $C_{23}$ aliphatic hydrocarbyl fatty acid hydrocarbyl ester(s), as defined herein, and/or one or more sulfurized $C_5$ to $C_{29}$, preferably $C_7$ to $C_{29}$, more preferably $C_9$ to $C_{27}$, most preferably $C_1$ to $C_{23}$ aliphatic hydrocarbyl fatty acid glycerol ester(s).

Suitably, greater than or equal to about 40 mass %, preferably greater than or equal to about 50 mass %, and more preferably greater than or equal to about 55 mass % of the one or more aliphatic hydrocarbyl fatty acid ester(s) include an aliphatic hydrocarbyl chain having at least one carbon to carbon double bond. Suitably, less than or equal to about 95 mass %, preferably less than or equal to about 90 mass %, more preferably less than or equal to about 85 mass % of the one or more aliphatic hydrocarbyl fatty acid ester(s) include an aliphatic hydrocarbyl chain having at least one carbon to carbon double bond. Suitably, from about 40 mass % to about 95 mass %, preferably from about 50 mass % to about 90 mass %, and more preferably from about 55 mass % to about 80 mass % of the one or more aliphatic hydrocarbyl fatty acid ester(s) include an aliphatic hydrocarbyl chain having at least one carbon to carbon double bond. Alternatively, up to 100 mass % of the one or more aliphatic hydrocarbyl fatty acid ester(s) include an aliphatic hydrocarbyl chain having at least one carbon to carbon double bond (i.e. all of the fatty acid ester(s) are derived from unsaturated fatty acid(s)).

Methods of making sulfurized materials are well known. A suitable method, by way of example, is described in Lubricant Additives: Chemistry and Applications, Ed. Leslie R Rudnick, Chapter 9 (Sulfur Carriers—T. Rossrucker and A Fessenbecker), CPC Press 2003. This method generally comprises mixing the unsaturated fatty acid ester starting material with elemental sulfur and heating to about the melting point of the sulphur at low or moderate pressure (1-2 bar). The reaction may take place in the presence or absence of a catalyst. The resulting sulfurized ester may be post-treated by subjecting the ester to sparging with a nitrogen and/or nitrogen and oxygen gas mixture at elevated temperature.

As the sulfurized fatty acid ester is preferably derived from natural oils, it typically comprises a mixture of different molecular structures, including some unreacted (or non-sulfurized) fatty acid ester. The sulfurized fatty acid ester typically comprises of molecules having sulphur bridging groups. Suitably, the sulfurized fatty acid ester comprises fatty acid ester molecules bonded together by sulphur bridging groups comprising predominantly from 1 to 8 sulphur atoms. Alternatively, or additionally, the sulfurized fatty acid ester may comprise molecules having one or more of the sulphur group(s) selected from thioether groups, thiacyclopropane groups, thiol, dithiirane, thiophene groups or thiocarbonyl groups.

The most preferred sulfurized fatty acid ester(s) for use in the present invention comprise predominately sulfurized ester molecule(s) having a structure according to Formula 1 shown below. The sulfurized fatty acid ester(s) may comprise a minor proportion of compounds having a structure defined by any of Formulas 2 to 7 below. Preferably the compounds having a structure of Formula 2 to 7 are only present in impurity quantities.

Formula 1
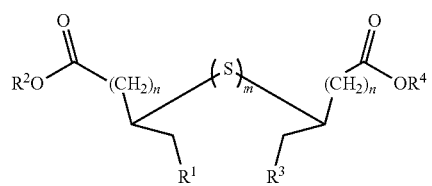

Formula 2
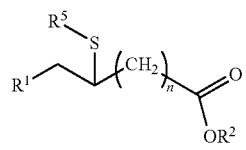

Formula 3
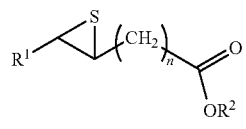

Formula 4
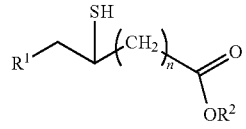

Formula 5
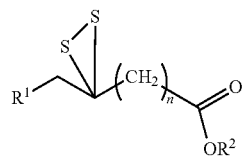

Formula 6
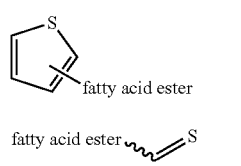

Formula 7

Whilst the sulfurized fatty acid ester of Formula 1 may comprise m=1 to 8, preferably the molecules in the sulfurized fatty acid ester in the highest proportion comprise a structure where m=3 to 5.

Suitably, in Formulae 1 to 7 above: $R^1$ and $R^3$ each independently represent a hydrocarbyl group, preferably an alkyl group, such that the total backbone chain, with intervening methylene groups and sulfur-bound carbon atoms to the carbonyl group, is 12 to 24 carbon atoms in length; $R^2$ and $R^4$ each independently represent H or hydrocarbyl, preferably H or $C_1$ to $C_6$ alkyl, especially H or methyl; $R^5$ represents H or hydrocarbyl; and, n=0 to 18, preferably n=0 to 12, more preferably n=0 to 10 or n=0 to 8. Advantageously, the majority of the ester comprises a molecule where n=7.

Suitable sulfurized fatty acid esters are available commercially and examples of suitable compounds include Dover Chemical's Base 10SE, Additin RC2310 or Additin RC2410 all from Rhein Chemie, and Esterol 10S from Arkema.

The amount of sulphur provided to the lubricating oil composition by the one or more sulfurized fatty acid ester(s) will depend upon the sulphur content of the sulfurized fatty acid ester(s) and the amount of sulfurized fatty acid ester(s) added to the lubricating oil composition.

Suitably, the one or more sulfurized fatty acid ester(s) provides the lubricating oil composition with greater than or equal to about 0.02, preferably greater than or equal to 0.05, more preferably greater than or equal to 0.08, mass % sulphur, based on the total mass of the lubricating oil composition. Suitably, the one or more sulfurized fatty acid ester(s) provides the lubricating oil composition with less than or equal to about 0.30, preferably less than or equal to 0.25, more preferably less than or equal to 0.20, mass % sulphur, based on the total mass of the lubricating oil composition. Suitably, the one or more sulfurized fatty acid ester(s) provides the lubricating oil composition with from 0.02 mass % to 0.30 mass % sulphur, preferably from 0.05 mass % to 0.30 mass % sulphur, more preferably 0.05 to 0.20 mass % sulphur.

Suitably, the sulphur content of the sulfurized fatty acid ester is greater than or equal to about 5, more preferably greater than or equal to about 7, even more preferably greater than or equal to about 9, even more preferably greater than or equal to about 10, mass % sulphur, based on the mass of the sulfurized fatty acid ester. Suitably, the sulphur content of the sulfurized fatty acid ester is less than or equal to about 25, preferably less than or equal to 20, mass % sulphur, based on the mass of the sulfurized fatty acid ester. Suitably, the sulfurized fatty acid ester contains from about 5, preferably 10, mass % to about 20 mass % sulphur. Most preferably, the sulfurized fatty acid ester contains about 10 mass % sulphur. Any suitable method may be used to determine the sulphur content of the sulfurized fatty acid ester, for example, one suitable method uses a CHNS-932 elemental analyser available from LECO Corporation, USA.

Suitably, the sulfurized fatty acid ester is phosphorous free.

Suitably, the sulfurized fatty acid ester is ashless.

Salicylate Detergent (C)

The lubricating oil composition of the present invention requires the presence of at least one alkali metal or alkaline earth metal salicylate detergent, as an additive in an effective minor amount, providing greater than or equal to 5.0 mmol of salicylate soap per kilogram of the lubricating oil composition.

A detergent is an additive that reduces formation of piston deposits, for example high-temperature varnish and lacquer deposits, in engines; it normally has acid-neutralising properties and is capable of keeping finely-divided solids in suspension. Most detergents are based on "soaps", that is metal salts of acidic organic compounds. Accordingly, the lubricating oil composition of the present invention includes an alkali metal or alkaline earth metal salt of salicylic acid as the soap i.e. salicylate soap.

The one or more alkali metal or alkaline earth metal salicylate detergent(s) provides the lubricating oil composition with greater than or equal to 5.0, preferably with greater than or equal to 5.5, more preferably greater than or equal 6.0, mmol of salicylate soap per kilogram of the lubricating oil composition. Preferably, the one or more alkali metal or alkaline earth metal salicylate detergent(s) provides the lubricating oil composition with less than or equal to 20, more preferably less than or equal 18, most preferably less than or equal to 15, mmol of salicylate soap per kilogram of the lubricating oil composition. Suitably, the at least one alkali metal or alkaline earth metal salicylate detergent provides the lubricating oil composition with from 5.0 to 20, preferably 5.5 to 18, more preferably 6.0 to 15, mmol of salicylate soap per kilogram of the lubricating oil composition.

By the term "salicylate soap" we mean the amount of alkali metal or alkaline earth metal salicylate salt contributed by the one or more alkali metal or alkaline earth metal salicylate detergent(s) exclusive of any overbasing material.

The number of moles of alkali metal or alkaline earth metal salicylate salt (salicylate soap) present in one or more alkali metal or alkaline earth metal salicylate detergent(s) can be derived by employing titrimetry, including two phase titrimetric methods, total acid number (TAN) as determined using ASTM D664, dialysis and other well-known analytical techniques. The total amount of metal must be determined and allocated between salicylic acids and inorganic acids using a metal ratio. The total amount of metal present is conveniently determined by inductively coupled plasma atomic emission spectrometry-ASTM D4951. Metal ratio is defined as the total amount of metal present divided by the amount of metal in excess of that required to neutralize any salicylic acid(s) present, i.e., the amount of metal neutralizing inorganic acids. Metal ratios are quoted by manufacturers of commercial detergents and can be determined by a manufacturer having knowledge of the total amount of salts present and the average molecular weight of the salicylic acid(s). The amount of alkali metal or alkaline earth metal salicylate salt present in a detergent may be determined by dialyzing the detergent and quantifying the amount of the residue. If the average molecular weight of the salicylic salts is not known, the residue from the dialyzed detergent can be treated with strong acid to convert the salt to its acid form, analyzed by chromatographic methods, proton NMR, and mass spectroscopy and correlated to salicylic acids of known properties. More particularly, the detergent is dialysed and then the residue is treated with strong acid to convert any salts to their respective acid forms. The hydroxide number of the mixture can then be measured by the method described in ASTM D1957. As salicylic acids include hydroxyl functional groups separate analyses must be conducted to quantify the amounts of those hydroxyl groups so that the hydroxide number determined by ASTM D1957 can be corrected.

Alternatively, a second method for deriving the number of moles of alkali metal or alkaline earth metal salicylate salt (salicylate soap) assumes that all of the salicylic acid(s) charged to make the detergent is in fact converted to the salt. Both of these two methods allow determination of the amount of salicylate soap present in the detergent.

The salicylic acid(s) are typically prepared by carboxylation, for example by the Kolbe-Schmitt process, of phenoxides. Processes for overbasing the salicylic acid(s) are known to those skilled in the art.

Detergents generally comprise a polar head with a long hydrophobic tail, the polar head comprising the metal salt of the acidic organic compound. The salts may contain a substantially stoichiometric amount of the metal when they are usually described as normal or neutral salts and would typically have a total base number or TBN at 100% active mass (as may be measured by ASTM D2896) of from 0 to 80. Large amounts of a metal base can be included by reaction of an excess of a metal compound, such as an oxide or hydroxide, with an acidic gas such as carbon dioxide. The resulting overbased detergent comprises neutralised detergent as an outer layer of a metal base (e.g. carbonate) micelle. Such overbased detergents may have a TBN at 100% active mass of 150 or greater, and typically of from 200 to 500 or more.

Suitably, the one or more alkali metal or alkali earth metal salicylate detergent(s) may be neutral or overbased. Suitably, the one or more alkali metal or alkali earth metal salicylate detergent(s) has a TBN at 100% active mass of from 0 to 600 (as may be measured by ASTM D2896). Preferably, the one or more alkali metal or alkaline earth metal salicylate detergent(s) is an overbased alkali metal or alkaline earth metal salicylate detergent. Preferably, the one or more overbased alkali metal or alkaline earth metal salicylate detergent(s) has a TBN at 100% active mass (as may be measured by ASTM D2896) of greater than or equal to 150, preferably greater than or equal to 200, more preferably greater than or equal to 250. Preferably, the one or more overbased alkali metal or alkaline earth metal salicylate detergent(s) has a TBN at 100% active mass (as may be measured by ASTM D2896) of less than or equal to 600, preferably less than or equal to 550, more preferably less than or equal to 500. Suitably, the one or more overbased alkali metal or alkaline earth metal salicylate detergent(s) has a TBN at 100% active mass (as may be measured by ASTM D2896) of from 150 to 600, preferably 150 to 500, more preferably 200 to 500.

Preferably, the one or more alkali metal or alkaline earth metal salicylate detergent(s) is one or more alkali metal or alkaline earth metal $C_5$ to $C_{30}$ alkyl salicylate detergent(s), more preferably one or more alkali metal or alkaline earth metal $C_{10}$ to $C_{20}$ alkyl salicylate detergents(s), most preferably one or more alkali metal or alkaline earth metal $C_{14}$ to $C_{18}$ alkyl salicylate detergent(s). The alkyl group(s) may be linear or branched and examples of suitable alkyl groups include: octyl; nonyl; decyl; dodecyl; pentadecyl; octadecyl; eicosyl; docosyl; tricosyl; hexacosyl; and, triacontyl. The one or more alkali metal or alkaline earth metal salicylate detergent(s), as defined herein, may also include sulfurized derivatives thereof.

Preferably, the one or more alkali metal or alkaline earth metal salicylate detergent(s) is one or more alkaline earth metal salicylate detergents. Calcium and magnesium salicylate detergents are particularly preferred, especially calcium salicylate detergents.

Preferably, the one or more alkali or alkaline earth metal salicylate detergent(s) provides the lubricating oil composition with greater than or equal to 0.05, more preferably greater than or equal to 0.06, more preferably greater than or equal to 0.07, most preferably greater than or equal to 0.10 mass % of metal as measured by ASTM D5185, based on the total mass of the lubricating oil composition. Preferably, the one or more alkali or alkaline earth metal salicylate detergent(s) provides the lubricating oil composition with less than or equal to 1.50, more preferably less than or equal to 1.0, even more preferably less than or equal to 0.50, even more preferably less than or equal to 0.40, most preferably less than or equal to 0.30, mass % of metal as measured by ASTM D5185, based on the total mass of the lubricating oil composition.

It will be appreciated that the one or more alkali or alkaline earth metal salicylate detergent(s) is included in the lubricating oil composition in an amount such that total amount of sulfated ash contributed by the detergent component to the lubricant, and any other metal containing component which may be present (e.g. ZDDP), is preferably less than or equal to 1.2, more preferably less than or equal to 1.1, even more preferably less than or equal to 1.0, even more preferably less than or equal to 0.95, mass % as determined by ASTM D874. Preferably, the one or more alkali or alkaline earth metal salicylate detergent(s) is included in the lubricating oil composition in an amount such that total amount of sulfated ash contributed by the detergent component to the lubricant, and any other metal containing component which may be present, is greater than or equal to 0.30, preferably greater than or equal to 0.40, mass % as determined by ASTM D874.

Preferably, the one or more alkali or alkaline earth metal salicylate detergent(s) is present in an amount of greater than or equal to 0.1, more preferably greater than or equal to 0.2, most preferably greater than or equal to 0.5, mass % based on the total mass of the lubricating oil composition. Preferably, the one or more alkali or alkaline earth metal salicylate detergent(s) is present in an amount of less than or equal to 15, more preferably less than or equal to 9, most preferably less than or equal to 5, mass % based on the total mass of the lubricating oil composition.

Other metal containing detergents may be present in the lubricating oil composition and include oil-soluble salts of neutral and overbased sulfonates, phenates, sulfurized phenates, thiophosphonates and naphthenates of a metal, particularly the alkali or alkaline earth metals, e.g. sodium, potassium, lithium, calcium and magnesium. The most commonly used metals are calcium and magnesium, which may both be present in detergents used in a lubricant, and mixtures of calcium and/or magnesium with sodium. Detergents may be used in various combinations.

According to a highly preferred aspect of the present invention, the one or more alkali or alkaline earth metal salicylate detergent(s) represent the only metal containing detergent(s) in the lubricating oil composition.

Molybdenum Compound (D)

Lubricating oil compositions of the present invention may optionally comprise a small quantity of one or more oil-soluble or oil-dispersible molybdenum compounds. Any suitable oil-soluble or oil-dispersible molybdenum compound having friction modifying properties in lubricating oil compositions may be employed. Preferably, the oil-soluble or oil-dispersible molybdenum compound is an oil-soluble or oil-dispersible organo-molybdenum compound. As examples of such organo-molybdenum compounds, there may be mentioned molybdenum dithiocarbamates, molybdenum dithiophosphates, molybdenum dithiophosphinates, molybdenum xanthates, molybdenum thioxanthates, molybdenum sulfides, and the like, and mixtures thereof. Particularly preferred are molybdenum dithiocarbamates, molybdenum dialkyldithiophosphates, molybdenum alkyl xanthates and molybdenum alkylthioxanthates. An especially preferred organo-molybdenum compound is a molybdenum dithiocarbamate.

Suitably, the molybdenum compound, if present, is present in an amount that provides the lubricating oil composition with at least 5, such as at least 20, or at least 40, preferably at least 60 ppm of molybdenum (ASTM D5185), based on the total mass of the lubricating oil composition. When present, the organo molybdenum compound provides the lubricating oil composition with less than or equal to 1200, such as less than or equal to 1000, or less than or equal to 750 or less than or equal to 500, or less than or equal to 200 ppm of molybdenum (ASTM D5185), based on the total mass of the lubricating oil composition.

In one embodiment of the present invention the molybdenum compound provides the lubricating oil composition with no more than 55, preferably no more than 50, more preferably no more than 45, ppm of molybdenum (ASTM D5185) based on the total mass of the lubricating oil composition. Suitably, the molybdenum compound, if present, is present in an amount that provides the lubricating oil composition with at least 2, preferably at least 5, ppm of molybdenum (ASTM D5185) based on the total mass of the lubricating oil composition.

Whilst the invention does not require any molybdenum compound to be present, some molybdenum may be beneficial for wear performance. The molybdenum compound may be present in an amount to provide 2 to 1200, Suitably from 5 to 1000, or from 5 to 750, preferably from 5 to 500, more preferably 5 to 200, ppm of molybdenum based on the total mass of the lubricating oil composition.

The molybdenum compound may be mono-, di-, tri- or tetra-nuclear. Di-nuclear and tri-nuclear molybdenum compounds are preferred, especially preferred are tri-nuclear molybdenum compounds. Preferably, the oil-soluble or oil-dispersible molybdenum compound is an oil-soluble or oil-dispersible organo-molybdenum compound. Suitably, a preferred organo-molybdenum compound includes a di- or tri-nuclear organo-molybdenum compound, more preferably a di- or tri-nuclear molybdenum dithiocarbamate, especially a tri-nuclear molybdenum dithiocarbamate.

Among the molybdenum compounds useful in the compositions of this invention are organo-molybdenum compounds of the formulae $Mo(ROCS_2)_4$ and $Mo(RSCS_2)_4$, wherein R is an organo group selected from the group consisting of alkyl, aryl, aralkyl and alkoxyalkyl, generally of from 1 to 30 carbon atoms, and preferably 2 to 12 carbon atoms and most preferably alkyl of 2 to 12 carbon atoms. Especially preferred are the dialkyldithiocarbamates of molybdenum.

One class of preferred organo-molybdenum compounds useful in the lubricating compositions of this invention are tri-nuclear organo-molybdenum compounds, especially those of the formula $Mo_3S_kL_nQ_z$ and mixtures thereof wherein L are independently selected ligands having organo groups with a sufficient number of carbon atoms to render the compound soluble or dispersible in the oil, n is from 1 to 4, k varies from 4 through 7, Q is selected from the group of neutral electron donating compounds such as water, amines, alcohols, phosphines, and ethers, and z ranges from 0 to 5 and includes non-stoichiometric values. At least 21 total carbon atoms should be present among all the ligands' organo groups, such as at least 25, at least 30, or at least 35 carbon atoms.

The ligands are independently selected from the group of:

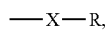      1

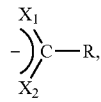      2

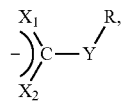      3 and mixtures thereof, wherein X, $X_1$, $X_2$, and Y are independently selected from the group of oxygen and sulfur, and wherein $R_1$, $R_2$, and R are independently selected from hydrogen and organo groups that may be the same or different Preferably, the organo groups are hydrocarbyl groups such as alkyl (e.g., in which the carbon atom attached to the remainder of the ligand is primary or secondary), aryl, substituted aryl and ether groups. More preferably, each ligand has the same hydrocarbyl group.

Importantly, the organo groups of the ligands have a sufficient number of carbon atoms to render the compound soluble or dispersible in the oil. For example, the number of carbon atoms in each group will generally range between about 1 to about 100, preferably from about 1 to about 30, and more preferably between about 4 to about 20. Preferred ligands include dialkyldithiophosphate, alkylxanthate, and dialkyldithiocarbamate, and of these dialkyldithiocarbamate is more preferred. Organic ligands containing two or more of the above functionalities are also capable of serving as ligands and binding to one or more of the cores. Those skilled in the art will realize that formation of the compounds of the present invention requires selection of ligands having the appropriate charge to balance the core's charge.

Compounds having the formula $Mo_3S_kL_nQ_z$ have cationic cores surrounded by anionic ligands and are represented by structures such as

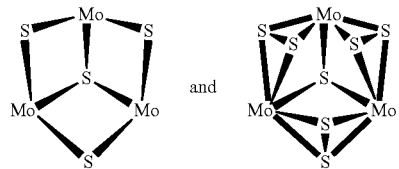

and have net charges of +4. Consequently, in order to solubilize these cores the total charge among all the ligands must be −4. Four mono-anionic ligands are preferred. Without wishing to be bound by any theory, it is believed that two or more tri-nuclear cores may be bound or interconnected by means of one or more ligands and the ligands may be multidentate. This includes the case of a multidentate ligand having multiple connections to a single core. It is believed that oxygen and/or selenium may be substituted for sulfur in the core(s).

Oil-soluble or oil-dispersible tri-nuclear molybdenum compounds can be prepared by reacting in the appropriate liquid(s)/solvent(s) a molybdenum source such as $(NH_4)_2Mo_3S_{13}.n(H_2O)$, where n varies between 0 and 2 and includes non-stoichiometric values, with a suitable ligand source such as a tetralkylthiuram disulfide. Other oil-soluble or dispersible tri-nuclear molybdenum compounds can be formed during a reaction in the appropriate solvent(s) of a molybdenum source such as of $(NH_4)_2Mo_3S_{13}.n(H_2O)$, a ligand source such as tetralkylthiuram disulfide, dialkyldithiocarbamate, or dialkyldithiophosphate, and a sulfur abstracting agent such as cyanide ions, sulfite ions, or substituted phosphines. Alternatively, a tri-nuclear molybdenum-sulfur halide salt such as $[M']_2[Mo_3S_7A_6]$, where M' is a counter ion, and A is a halogen such as Cl, Br, or I, may be reacted with a ligand source such as a dialkyldithiocarbamate or dialkyldithiophosphate in the appropriate liquid(s)/solvent(s) to form an oil-soluble or dispersible trinuclear molybdenum compound. The appropriate liquid/solvent may be, for example, aqueous or organic.

A compound's oil solubility or dispersibility may be influenced by the number of carbon atoms in the ligand's organo groups. Preferably, at least 21 total carbon atoms should be present among all the ligands' organo groups. Preferably, the ligand source chosen has a sufficient number of carbon atoms in its organo groups to render the compound soluble or dispersible in the lubricating composition.

Ashless Anti-Oxidant (E)

Lubricating oil compositions of the present invention may optionally comprise a small quantity of one or more oil-soluble or oil-dispersible ashless anti-oxidant (comprising an oil-soluble or oil-dispersible aminic anti-oxidant, such as an aromatic amine anti-oxidant, a phenolic anti-oxidant, such as a hindered phenolic anti-oxidant, or a combination thereof. Ashless aminic anti-oxidant(s), especially aromatic amine anti-oxidant(s), are preferred. Most preferred anti-oxidant(s) are the dialkyl substituted diphenylamines, such as di-$C_4$-$C_{20}$ alkyl substituted diphenylamines and/or the hindered phenols, such as iso-octyl-3,5-di-tert-butyl-4-hydroxycinnamate.

Suitably, the one or more ashless anti-oxidant(s) is present in an amount of from 0.1 to 5.0, preferably 0.25 to 2.0, more preferably 0.5 to 1.5, mass %, based on the total mass of the lubricating oil composition.

Ashless Dispersant (F)

Lubricating oil compositions of the present invention may optionally comprise a small quantity of one or more oil-soluble or oil-dispersible ashless dispersants. Dispersants useful in the context of the present invention include the range of nitrogen-containing, ashless (metal-free) dispersants known to be effective to reduce formation of deposits upon use in gasoline and diesel engines, when added to lubricating oils. The ashless, dispersants useful for the present invention suitably comprise an oil soluble polymeric long chain backbone having functional groups capable of associating with particles to be dispersed. Typically, such dispersants have amine, amine-alcohol or amide polar moieties attached to the polymer backbone, often via a bridging group. A suitable ashless dispersant may be, for example, selected from oil soluble salts, esters, amino-esters, amides, imides and oxazolines of long chain hydrocarbon-substituted mono- and polycarboxylic acids or anhydrides thereof; thiocarboxylate derivatives of long chain hydrocarbons; long chain aliphatic hydrocarbons having polyamine moieties attached directly thereto; and Mannich condensation products formed by condensing a long chain substituted phenol with formaldehyde and polyalkylene polyamine.

A dispersant suitable for lubricating oil compositions of the present invention may be derived from polyalkenyl-substituted mono- or dicarboxylic acid, anhydride or ester, which dispersant has a polyalkenyl moiety with a number average molecular weight of at least 900 and from greater than 1.3 to 1.7, preferably from greater than 1.3 to 1.6, most preferably from greater than 1.3 to 1.5 functional groups (mono- or dicarboxylic acid producing moieties) per polyalkenyl moiety (a medium functionality dispersant). Functionality (F) can be determined according to the following formula:

$$F=(SAP \times M_n)/((112{,}200 \times A.I.)-(SAP \times MW)) \quad (1)$$

wherein SAP is the saponification number (i.e., the number of milligrams of KOH consumed in the complete neutralization of the acid groups in one gram of the reaction product, as determined according to ASTM 194); $M_n$ is the number average molecular weight of the starting olefin polymer, A.I. is the percent active ingredient of the reaction product (the remainder being unreacted olefin polymer, carboxylic acid, anhydride or ester and diluent); and MW is the molecular weight of the carboxylic acid, anhydride or ester (e.g., 98 for succinic anhydride).

Generally, each mono- or dicarboxylic acid-producing moiety will react with a nucleophilic group (amine, alcohol, amide or ester polar moieties) and the number of functional groups in the polyalkenyl-substituted carboxylic acylating agent will determine the number of nucleophilic groups in the finished dispersant.

The polyalkenyl moiety of the dispersant of the present invention has a number average molecular weight of at least 900, suitably at least 1500, preferably between 1800 and 3000, such as between 2000 and 2800, more preferably from 2100 to 2500, and most preferably from 2200 to 2400. The molecular weight of a dispersant is generally expressed in terms of the molecular weight of the polyalkenyl moiety as the precise molecular weight range of the dispersant depends on numerous parameters including the type of polymer used to derive the dispersant, the number of functional groups, and the type of nucleophilic group employed.

Polymer molecular weight, specifically $\overline{M}_n$, can be determined by various known techniques. One convenient method is gel permeation chromatography (GPC), which additionally provides molecular weight distribution information (see W. W. Yau, J. J. Kirkland and D. D. Bly, "Modern Size Exclusion Liquid Chromatography", John Wiley and Sons, New York, 1979). Another useful method for determining molecular weight, particularly for lower molecular weight polymers, is vapor pressure osmometry (see, e.g., ASTM D3592).

The polyalkenyl moiety suitable for forming a dispersant useful in a composition of the present invention preferably has a narrow molecular weight distribution (MWD), also referred to as polydispersity, as determined by the ratio of weight average molecular weight ($M_w$) to number average molecular weight ($M_n$). Polymers having a $M_w/M_n$ of less than 2.2, preferably less than 2.0, are most desirable. Suitable polymers have a polydispersity of from 1.5 to 2.1, preferably from 1.6 to 1.8.

Suitable hydrocarbons or polymers employed in the formation of the dispersants of the present invention include homopolymers, interpolymers or lower molecular weight hydrocarbons. One family of such polymers comprise polymers of ethylene and/or at least one $C_3$ to $C_{28}$ alpha-olefin having the formula $H_2C=CHR^1$ wherein $R^1$ is straight or branched chain alkyl radical comprising 1 to 26 carbon atoms and wherein the polymer contains carbon-to-carbon unsaturation, preferably a high degree of terminal ethenylidene unsaturation. Preferably, such polymers comprise interpolymers of ethylene and at least one alpha-olefin of the above formula, wherein $R^1$ is alkyl of from 1 to 18 carbon atoms, and more preferably is alkyl of from 1 to 8 carbon atoms, and more preferably still of from 1 to 2 carbon atoms Another useful class of polymers is polymers prepared by cationic polymerization of isobutene, styrene, and the like. Common polymers from this class include polyisobutenes obtained by polymerization of a $C_4$ refinery stream having a butene content of 35 to 75% by wt., and an isobutene content of 30 to 60 mass %, in the presence of a Lewis acid catalyst, such as aluminum trichloride or boron trifluoride. A preferred source of monomer for making poly-n-butenes is petroleum feedstreams such as Raffinate II. These feedstocks are disclosed in the art such as in U.S. Pat. No. 4,952,739. Polyisobutylene is a most preferred backbone of the present invention because it is readily available by cationic polymerization from butene streams (e.g., using $AlCl_3$ or $BF_3$ catalysts). Such polyisobutylenes generally contain residual unsaturation in amounts of one ethylenic double bond per polymer chain, positioned along the chain. A preferred embodiment utilizes polyisobutylene prepared from a pure isobutylene stream or a Raffinate I stream to prepare reactive isobutylene polymers with terminal vinylidene olefins. Preferably, these polymers, referred to as highly reactive polyisobutylene (HR-PIB), have a terminal vinylidene content of at least 65%, e.g., 70%, more preferably at least 80%, most preferably, at least 85%. The preparation of such polymers is described, for example, in U.S. Pat. No. 4,152,499. HR-PIB is known and HR-PIB is commercially available under the tradenames Glissopal™ (from BASF) and Ultravis™ (from BP-Amoco).

Polyisobutylene polymers that may be employed are generally based on a hydrocarbon chain of from 1500 to 3000. Methods for making polyisobutylene are known. Polyisobutylene can be functionalized by halogenation (e.g. chlorination), the thermal "ene" reaction, or by free radical grafting using a catalyst (e.g. peroxide), as described below.

The hydrocarbon or polymer backbone can be functionalized, e.g., with carboxylic acid producing moieties (preferably acid or anhydride moieties) selectively at sites of carbon-to-carbon unsaturation on the polymer or hydrocarbon chains, or randomly along chains using any of the three processes mentioned above or combinations thereof, in any sequence.

Processes for reacting polymeric hydrocarbons with unsaturated carboxylic acids, anhydrides or esters and the preparation of derivatives from such compounds are disclosed in U.S. Pat. Nos. 3,087,936; 3,172,892; 3,215,707; 3,231,587; 3,272,746; 3,275,554; 3,381,022; 3,442,808; 3,565,804; 3,912,764; 4,110,349; 4,234,435; 5,777,025; 5,891,953; as well as EP 0 382 450 B1; CA-1,335,895 and GB-A-1,440,219. The polymer or hydrocarbon may be functionalized, for example, with carboxylic acid producing moieties (preferably acid or anhydride) by reacting the polymer or hydrocarbon under conditions that result in the addition of functional moieties or agents, i.e., acid, anhydride, ester moieties, etc., onto the polymer or hydrocarbon chains primarily at sites of carbon-to-carbon unsaturation (also referred to as ethylenic or olefinic unsaturation) using the halogen assisted functionalization (e.g. chlorination) process or the thermal "ene" reaction.

Selective functionalization can be accomplished by halogenating, e.g., chlorinating or brominating the unsaturated α-olefin polymer to 1 to 8 mass %, preferably 3 to 7 mass % chlorine, or bromine, based on the weight of polymer or hydrocarbon, by passing the chlorine or bromine through the polymer at a temperature of 60 to 250° C., preferably 110 to 160° C., e.g., 120 to 140° C., for 0.5 to 10 hours, preferably 1 to 7 hours. The halogenated polymer or hydrocarbon (hereinafter backbone) is then reacted with sufficient monounsaturated reactant capable of adding the required number of functional moieties to the backbone, e.g., monounsaturated carboxylic reactant, at 100 to 250° C., usually 180° C. to 235° C., for 0.5 to 10 hours, e.g., 3 to 8 hours, such that the product obtained will contain the desired number of moles of the monounsaturated carboxylic reactant per mole of the halogenated backbones. Alternatively, the backbone and the monounsaturated carboxylic reactant are mixed and heated while adding chlorine to the hot material.

The hydrocarbon or polymer backbone can be functionalized by random attachment of functional moieties along the polymer chains by a variety of methods. For example, the polymer, in solution or in solid form, may be grafted with the monounsaturated carboxylic reactant, as described above, in the presence of a free-radical initiator. When performed in solution, the grafting takes place at an elevated temperature in the range of 100 to 260° C., preferably 120 to 240° C. Preferably, free-radical initiated grafting would be accomplished in a mineral lubricating oil solution containing, e.g., 1 to 50 mass %, preferably 5 to 30 mass % polymer based on the initial total oil solution.

Monounsaturated reactants that may be used to functionalize the backbone comprise mono- and dicarboxylic acid material, i.e., acid, anhydride, or acid ester material, including (i) monounsaturated $C_4$ to $C_{10}$ dicarboxylic acid wherein (a) the carboxyl groups are vicinyl, (i.e., located on adjacent carbon atoms) and (b) at least one, preferably both, of said adjacent carbon atoms are part of said mono unsaturation; (ii) derivatives of (i) such as anhydrides or $C_1$ to $C_5$ alcohol derived mono- or diesters of (i); (iii) monounsaturated $C_3$ to $C_{10}$ monocarboxylic acid wherein the carbon-carbon double bond is conjugated with the carboxy group, i.e., of the structure —C=C—CO—; and (iv) derivatives of (iii) such as $C_1$ to $C_5$ alcohol derived mono- or diesters of (iii). Mixtures of monounsaturated carboxylic materials (i)-(iv) also may be used. Upon reaction with the backbone, the monounsaturation of the monounsaturated carboxylic reactant becomes saturated. Thus, for example, maleic anhydride becomes backbone-substituted succinic anhydride, and acrylic acid becomes backbone-substituted propionic acid. Exemplary of such monounsaturated carboxylic reactants are fumaric acid, itaconic acid, maleic acid, maleic anhydride, chloromaleic acid, chloromaleic anhydride, acrylic acid, methacrylic acid, crotonic acid, cinnamic acid, and lower alkyl (e.g., $C_1$ to $C_4$ alkyl) acid esters of the foregoing, e.g., methyl maleate, ethyl fumarate, and methyl fumarate.

To provide the required functionality, the monounsaturated carboxylic reactant, preferably maleic anhydride, typically will be used in an amount ranging from equimolar amount to 100 mass % excess, preferably 5 to 50 mass % excess, based on the moles of polymer or hydrocarbon. Unreacted excess monounsaturated carboxylic reactant can be removed from the final dispersant product by, for example, stripping, usually under vacuum, if required.

The functionalized oil-soluble polymeric hydrocarbon backbone is then derivatized with a nucleophilic reactant, such as an amine, amino-alcohol, alcohol, metal compound, or mixture thereof, to form a corresponding derivative. Useful amine compounds for derivatizing functionalized polymers comprise at least one amine and can comprise one or more additional amine or other reactive or polar groups. These amines may be hydrocarbyl amines or may be predominantly hydrocarbyl amines in which the hydrocarbyl group includes other groups, e.g., hydroxy groups, alkoxy groups, amide groups, nitriles, imidazoline groups, and the like. Particularly useful amine compounds include mono- and polyamines, e.g., polyalkene and polyoxyalkylene polyamines of 2 to 60, such as 2 to 40 (e.g., 3 to 20) total carbon atoms having 1 to 12, such as 3 to 12, preferably 3 to 9, most preferably form 6 to 7 nitrogen atoms per molecule. Mixtures of amine compounds may advantageously be used, such as those prepared by reaction of alkylene dihalide with ammonia. Preferred amines are aliphatic saturated amines, including, for example, 1,2-diaminoethane; 1,3-diaminopropane; 1,4-diaminobutane; 1,6-diaminohexane; polyethylene amines such as diethylene triamine; triethylene tetramine; tetraethylene pentamine; and polypropyleneamines such as 1,2-propylene diamine; and di-(1,2-propylene)triamine. Such polyamine mixtures, known as PAM, are commercially available. Particularly preferred polyamine mixtures are mixtures derived by distilling the light ends from PAM products. The resulting mixtures, known as "heavy" PAM, or HPAM, are also commercially available. The properties and attributes of both PAM and/or HPAM are described, for example, in U.S. Pat. Nos. 4,938,881; 4,927,551; 5,230,714; 5,241,003; 5,565,128; 5,756,431; 5,792,730; and 5,854,186.

Dispersant(s) used in lubricating oil compositions of the present invention may be borated by conventional means, as generally taught in U.S. Pat. Nos. 3,087,936, 3,254,025 and 5,430,105. Boration of the dispersant is readily accomplished by treating an acyl nitrogen-containing dispersant with a boron compound such as boron oxide, boron halide boron acids, and esters of boron acids, in an amount sufficient to provide from 0.1 to 20 atomic proportions of boron for each mole of acylated nitrogen composition.

The boron, which appears in the product as dehydrated boric acid polymers (primarily $(HBO_2)_3$), is believed to attach to the dispersant imides and diimides as amine salts, e.g., the metaborate salt of the diimide. Boration can be carried out by adding a sufficient quantity of a boron compound, preferably boric acid, usually as a slurry, to the acyl nitrogen compound and heating with stirring at from 135° C. to 190° C., e.g., 140° C. to 170° C., for from 1 to 5 hours, followed by nitrogen stripping. Alternatively, the boron treatment can be conducted by adding boric acid to a hot reaction mixture of the dicarboxylic acid material and amine, while removing water. Other post reaction processes known in the art can also be applied.

If a borated dispersant is present in a lubricating oil composition according to the present invention, the amount of boron provided to the lubricating oil composition by the borated dispersant is suitably at least 10, such as at least 30, for example, at least 50 or even at least 65 ppm of boron, based on the total mass of the lubricating oil composition. If present, the borated ashless dispersant suitably provides no more than 1000, preferably no more than 750, more preferably no more than 500 ppm of boron to the lubricating oil composition, based on the total mass of the lubricating oil composition.

Engines

The lubricating oil compositions of the invention may be used to lubricate mechanical engine components, particularly in internal combustion engines, e.g. spark-ignited or compression-ignited internal combustion engines, particularly spark-ignited or compression-ignited two- or four-stroke reciprocating engines, by adding the composition thereto. The engines may be conventional gasoline or diesel engines designed to be powered by gasoline or petroleum diesel, respectively; alternatively, the engines may be specifically modified to be powered by an alcohol based fuel or biodiesel fuel. The lubricating oil compositions of the present invention are particularly suitable for lubricating a turbo-driven forced induction device, such as a turbocharger or supercharger, especially a turbocharger.

Co-Additives

Co-additives, with representative effective amounts, that may also be present, different from additive components (B) and (C), and (D) and/or (E) if present, are listed below. All the values listed are stated as mass percent active ingredient in a fully formulated lubricant.

| Additive | Mass % (Broad) | Mass % (Preferred) |
|---|---|---|
| Ashless Dispersant | 0.1-20 | 1-8 |
| Metal Detergents | 0.1-15 | 0.2-9 |
| Friction modifier | 0-5 | 0-1.5 |
| Corrosion Inhibitor | 0-5 | 0-1.5 |
| Metal Dihydrocarbyl Dithiophosphate | 0-10 | 0-4 |
| Anti-Oxidants | 0-5 | 0.01-3 |
| Pour Point Depressant | 0.01-5 | 0.01-1.5 |
| Anti-Foaming Agent | 0-5 | 0.001-0.15 |
| Supplement Anti-Wear Agents | 0-5 | 0-2 |
| Viscosity Modifier (1) | 0-10 | 0.01-4 |
| Mineral or Synthetic Base Oil | Balance | Balance |

(1) Viscosity modifiers are used only in multi-graded oils.

The final lubricating oil composition, typically made by blending the or each additive into the base oil, may contain from 5 to 25, preferably 5 to 18, typically 7 to 15, mass % of the co-additives, the remainder being oil of lubricating viscosity.

Suitably, the lubricating oil composition includes one or more co-additives in a minor amount, other than additive components (B) and (C), and (D) and/or (E) if present, selected from ashless dispersants, metal detergents, corrosion inhibitors, antioxidants, pour point depressants, anti-wear agents, friction modifiers, demulsifiers, antifoam agents and viscosity modifiers.

The above mentioned co-additives are discussed in further detail as follows; as is known in the art, some additives can provide a multiplicity of effects, for example, a single additive may act as a dispersant and as an oxidation inhibitor.

Anti-wear agents reduce friction and excessive wear and are usually based on compounds containing sulfur or phosphorous or both, for example that are capable of depositing polysulfide films on the surfaces involved. Noteworthy are dihydrocarbyl dithiophosphate metal salts wherein the metal may be an alkali or alkaline earth metal, or aluminium, lead, tin, molybdenum, manganese, nickel, copper, or preferably, zinc.

Dihydrocarbyl dithiophosphate metal salts may be prepared in accordance with known techniques by first forming a dihydrocarbyl dithiophosphoric acid (DDPA), usually by reaction of one or more alcohols or a phenol with $P_2S_5$ and then neutralizing the formed DDPA with a metal compound. For example, a dithiophosphoric acid may be made by reacting mixtures of primary and secondary alcohols. Alternatively, multiple dithiophosphoric acids can be prepared where the hydrocarbyl groups on one are entirely secondary in character and the hydrocarbyl groups on the others are entirely primary in character. To make the metal salt, any basic or neutral metal compound could be used but the oxides, hydroxides and carbonates are most generally employed. Commercial additives frequently contain an excess of metal due to the use of an excess of the basic metal compound in the neutralization reaction.

The preferred zinc dihydrocarbyl dithiophosphates (ZDDP) are oil-soluble salts of dihydrocarbyl dithiophosphoric acids and may be represented by the following formula:

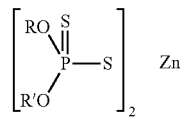

wherein R and R' may be the same or different hydrocarbyl radicals containing from 1 to 18, preferably 2 to 12, carbon atoms and including radicals such as alkyl, alkenyl, aryl, arylalkyl, alkaryl and cycloaliphatic radicals. Particularly preferred as R and R' groups are alkyl groups of 2 to 8 carbon atoms. Thus, the radicals may, for example, be ethyl, n-propyl, i-propyl, n-butyl, i-butyl, sec-butyl, amyl, n-hexyl, i-hexyl, n-octyl, decyl, dodecyl, octadecyl, 2-ethylhexyl, phenyl, butylphenyl, cyclohexyl, methylcyclopentyl, propenyl, butenyl. In order to obtain oil solubility, the total number of carbon atoms (i.e. R and R') in the dithiophosphoric acid will generally be about 5 or greater. The zinc dihydrocarbyl dithiophosphate can therefore comprise zinc dialkyl dithiophosphates.

The ZDDP is added to the lubricating oil compositions in amounts sufficient to provide no greater than 1200 ppm, preferably no greater than 1000 ppm, more preferably no greater than 900 ppm, most preferably no greater than 850 ppm by mass of phosphorous to the lubricating oil, based upon the total mass of the lubricating oil composition, and as measured in accordance with ASTM D5185. The ZDDP is suitably added to the lubricating oil compositions in amounts sufficient to provide at least 100 ppm, preferably at least 350 ppm, more preferably at least 500 ppm by mass of phosphorous to the lubricating oil, based upon the total mass of the lubricating oil composition, and as measured in accordance with ASTM D5185.

Examples of ashless anti-wear agents include 1,2,3-triazoles, benzotriazoles, sulfurised fatty acid esters, and dithiocarbamate derivatives.

Metal detergents which may be present, in addition to the one or more alkali metal or alkaline earth metal salicylate(s), include oil-soluble neutral and overbased sulfonates, phenates, sulfurized phenates, thiophosphonates, and naphthenates and other oil-soluble carboxylates of a metal, particularly the alkali or alkaline earth metals, e.g., sodium, potassium, lithium, calcium, and magnesium. The most commonly used metals are calcium and magnesium, which may both be present in detergents used in a lubricant, and mixtures of calcium and/or magnesium with sodium. Combinations of detergents, whether overbased or neutral or both, may be used.

In a preferred aspect of the present invention, the one or more alkali metal or alkaline earth metal salicylate(s) (C) are the only metal detergent(s) present in the lubricating oil composition.

Ashless Friction modifiers may be present in the lubricating oil compositions of the present invention and are known generally and include esters formed by reacting carboxylic acids and anhydrides with alkanols and amine-based friction modifiers. Other useful friction modifiers generally include a polar terminal group (e.g. carboxyl or hydroxyl) covalently bonded to an oleophilic hydrocarbon chain. Esters of carboxylic acids and anhydrides with alkanols are described in U.S. Pat. No. 4,702,850. Examples of other conventional organic friction modifiers are described by M. Belzer in the "Journal of Tribology" (1992), Vol. 114, pp. 675-682 and M. Belzer and S. Jahanmir in "Lubrication Science" (1988), Vol. 1, pp. 3-26.

Preferred organic ashless nitrogen-free friction modifiers are esters or ester-based; a particularly preferred organic ashless nitrogen-free friction modifier is glycerol monooleate (GMO).

Ashless aminic or amine-based friction modifiers may also be used and include oil-soluble alkoxylated mono- and di-amines, which improve boundary layer lubrication.

Typically, the total amount of additional organic ashless friction modifier in a lubricant according to the present invention does not exceed 5 mass %, based on the total mass of the lubricating oil composition and preferably does not exceed 2 mass % and more preferably does not exceed 0.5 mass %.

Viscosity modifiers (VM) function to impart high and low temperature operability to a lubricating oil. The VM used may have that sole function, or may be multifunctional. Multifunctional viscosity modifiers that also function as dispersants are also known. Suitable viscosity modifiers are polyisobutylene, copolymers of ethylene and propylene and higher alpha-olefins, polymethacrylates, polyalkylmethacrylates, methacrylate copolymers, copolymers of an unsaturated dicarboxylic acid and a vinyl compound, inter polymers of styrene and acrylic esters, and partially hydrogenated copolymers of styrene/isoprene, styrene/butadiene, and isoprene/butadiene, as well as the partially hydrogenated homopolymers of butadiene and isoprene and isoprene/divinylbenzene.

Rust inhibitors selected from the group consisting of nonionic polyoxyalkylene polyols and esters thereof, polyoxyalkylene phenols, and anionic alkyl sulfonic acids may be used.

Conner and lead bearing corrosion inhibitors may be used, but are typically not required with the formulation of the present invention. Typically such compounds are the thiadiazole polysulfides containing from 5 to 50 carbon atoms, their derivatives and polymers thereof. Derivatives of 1, 3, 4 thiadiazoles such as those described in U.S. Pat. Nos. 2,719,125; 2,719,126; and 3,087,932; are typical. Other similar materials are described in U.S. Pat. Nos. 3,821,236; 3,904,537; 4,097,387; 4,107,059; 4,136,043; 4,188,299; and 4,193,882. Other additives are the thio and polythio sulfenamides of thiadiazoles such as those described in UK Patent Specification No. 1,560,830. Benzotriazoles derivatives also fall within this class of additives. When these compounds are included in the lubricating composition, they are preferably present in an amount not exceeding 0.2 wt. % active ingredient.

A small amount of a demulsifying component may be used. A preferred demulsifying component is described in EP 330522. It is obtained by reacting an alkylene oxide with an adduct obtained by reacting a bis-epoxide with a polyhydric alcohol. The demulsifier should be used at a level not exceeding 0.1 mass % active ingredient. A treat rate of 0.001 to 0.05 mass % active ingredient is convenient.

Pour point depressants, otherwise known as lube oil flow improvers, lower the minimum temperature at which the fluid will flow or can be poured. Such additives are well known. Typical of those additives which improve the low temperature fluidity of the fluid are $C_8$ to $C_{18}$ dialkyl fumarate/vinyl acetate copolymers, polyalkylmethacrylates and the like.

Foam control can be provided by many compounds including an antifoamant of the polysiloxane type, for example, silicone oil or polydimethyl siloxane.

The individual additives may be incorporated into a base stock in any convenient way. Thus, each of the components can be added directly to the base stock or base oil blend by dispersing or dissolving it in the base stock or base oil blend at the desired level of concentration. Such blending may occur at ambient or elevated temperatures.

Preferably, all the additives except for the viscosity modifier and the pour point depressant are blended into a concentrate or additive package described herein as the additive package that is subsequently blended into base stock to make the finished lubricant. The concentrate will typically be formulated to contain the additive(s) in proper amounts to provide the desired concentration in the final formulation when the concentrate is combined with a predetermined amount of a base lubricant.

The concentrate is preferably made in accordance with the method described in U.S. Pat. No. 4,938,880. That patent describes making a pre-mix of ashless dispersant and metal detergents that is pre-blended at a temperature of at least about 100° C. Thereafter, the pre-mix is cooled to at least 85° C. and the additional components are added.

Typically, the additive package used to formulate the lubricating oil composition according to the present invention has a total base number (TBN) as measured by ASTM D2896 of 25 to 100, preferably 45 to 80, and the lubricating oil composition according to the present invention has a total base number (TBN) as measured by ASTM D2896 of 4 to 15, preferably 5 to 12. In an embodiment of the present invention, the additive package does not have a total base number (TBN) as measured by ASTM D2896 of between 62 and 63.5 and the lubricating oil composition does not have a total base number (TBN) as measured by ASTM D2896 of between 9.05 and 9.27.

The final crankcase lubricating oil formulation may employ from 2 to 20, preferably 4 to 18, and most preferably 5 to 17, mass % of the concentrate or additive package with the remainder being base stock.

EXAMPLES

The invention will now be described in the following examples which are not intended to limit the scope of the claims hereof.

TEOST 33C Test (ASTM D6335-09)

The TEOST 33C test (ASTM D6335-09) evaluates the high temperature deposit formation of a lubricating oil composition, in particular it simulates such deposit forming tendencies in a very high temperature environment when a lubricating oil composition lubricates a turbocharger. Suitable apparatus for performing the test is available from Tannas Company, USA. A sample of the lubricating oil composition (116 ml) containing ferric napthenate (6% mass, 100 ppm iron) and contacted with moist air (flow rate of 3.6 ml/min) and nitrous oxide (flow rate of 3.6 ml/min) is heated to a temperature of 100° C. and pumped at a set flow rate (0.4 g/min) past a tared depositor rod. The rod is resistively heated through twelve, 9.5 minute cycles that go from 200 to 480° C. during each cycle. When the twelve cycle program is complete, the depositor rod is rinsed of oil reside and the gross rod mass obtained. The lubricating oil composition sample is flushed from the system and filtered through a tared filter. The mass of deposits on the rod plus the mass of deposits on the filter represents the total deposit mass. The pass limit to meet the specification set by ILSAC GF-5 is less than or equal to 30 mg of total deposits.

TEOST MHT-4 Test (ASTM D7097-09)

The TEOST MHT-4 test (ASTM D7097-09) evaluates deposit formation at moderately high temperatures that are closely related to those of the piston ring zone in reciprocating engines (as distinguished from the much higher temperatures associated with the TEOST 33C test procedure for determining potential deposits in turbochargers). Suitable apparatus for performing the test is available from Tannas Company, USA. A none pre-heated sample of the lubricating oil composition (8.4 g) containing an organometallic catalyst (0.1 g of an iron/lead/tin catalyst) and contacted with dry air (10 ml/min) is circulated (0.25 g/min) for 24 hours in a TEOST MHT instrument over a wire-wound depositor rod heated by electrical current to a controlled temperature of 285° C. at the hottest location on the rod. The depositor rod is weighed before and after the test and any deposit formation on the rod as well as any deposits collected from the rod washings are determined. The pass limit to meet the specification set by ILSAC GF-5 is less than or equal to 35 mg of total deposits.

Examples 1 to 4

The lubricating oil composition of Examples 1 to 4 as detailed in Table 1 were subjected to the TEOST 33C and TEOST MHT-4 tests; the results of which (average of 3 tests) are detailed in Table 2. In addition to the components detailed in Table 1, each of the lubricating compositions of Examples 1 to 4 include identical amounts of the following identical components: dispersant; ZDDP; organo-molybdenum trimer (40 ppm of molybdenum); aromatic amine anti-oxidant (0.8 mass %); anti-foam; pour point depressant; and, viscosity modifier. Examples 1 to 3 represent comparative lubricating oil compositions, whereas Example 4 represents a lubricating oil composition of the present invention.

TABLE 1

|  | Example 1 mass % | Example 2 mass % | Example 3 mass % | Example 4 mass % |
|---|---|---|---|---|
| Calcium sulphonate detergent (TBN 295) | 1.83 (0.21 Ca) | 1.83 (0.21 Ca) | — | — |
| Calcium salicylate detergent (TBN 340) | — | — | 1.57 (0.20 Ca) | 1.57 (0.20 Ca) |
| Sulphurized palm oil Base 10SE* | — | 0.80 (800 ppm S) | — | 0.80 (800 ppm S) |
| Base stock | 83.92 | 83.12 | 83.92 | 83.12 |
| mmol salicylate soap | — | — | 6.12 | 6.12 |
| TBN (mg KOH/g) | 8.10 | 8.10 | 8.10 | 8.10 |
| Phosphorus ppm (ASTM D5185) | 800 | 800 | 800 | 800 |

*Available from Dover Chemicals

TABLE 2

|  | Example 1 | Example 2 | Example 3 | Example 4 |
|---|---|---|---|---|
| MHT-4 TEOST | 59.3 | 61.0 | 34.0 | 27.8 |
| 33C TEOST | 30.2 | 15.8 | 37.3 | 27.7 |

The results demonstrate that lubricating oil compositions including an overbased calcium sulphonate detergent (Comparative Examples 1 and 2) fail the TEOST MHT-4 test, but pass the TEOST 33C test irrespective of whether the lubricating oil composition includes a sulfurized fatty acid ester (Base 10 SE). In contrast a lubricating oil composition including an overbased calcium salicylate detergent (Comparative Example 3 and Inventive Example 4) passes the TEOST MHT-4 test, but the presence of a sulfurized fatty acid ester (Base 10 SE) is also required to pass the high temperature TEOST 33C test (Inventive Example 4 compared with Comparative Example 3).

Examples 5 to 9

The lubricating oil composition of Examples 5 to 9 as detailed in Table 3 were subjected to the TEOST 33C test; the results of which (average of 3 tests) are detailed in Table 4. In addition to the components detailed in Table 3, each of the lubricating compositions of Examples 5 to 9 include identical amounts of the following identical components: an overbased calcium salicylate detergent (TBN 340 providing 01.8 mass % calcium); dispersant; ZDDP; organo-molybdenum trimer (40 ppm of molybdenum); aromatic amine anti-oxidant (0.8 mass %); anti-foam; pour point depressant; and, viscosity modifier. Examples 5 to 7 represent comparative lubricating oil compositions; Example 5 does not include an additional sulphur containing compound; Example 6 includes an ashless dithiocarbamate (VL 7723 from Vanderbilt Chemicals) as an additional sulphur containing compound; and, Example 7 includes a sulphurized $C_{14}$ to $C_{18}$ olefin as an additional sulphur containing compound. Examples 8 and 9 represent lubricating oil compositions of the present invention and include a sulfurized fatty acid ester as an additional sulphur containing compound (Base 10SE from Dover Chemicals and ADDITIN RC2911 from Rhein Chemie/Lanxess, respectively). Each of the additional sulphur containing compounds of Examples 6 to 9 is added in an amount to provide 800 ppm of sulphur to the lubricating oil composition.

TABLE 3

|  | Example 5 mass % | Example 6 mass % | Example 7 mass % | Example 8 mass % | Example 9 mass % |
|---|---|---|---|---|---|
| Calcium salicylate detergent (TBN 340) | 1.57 | 1.57 | 1.57 | 1.57 | 1.57 |
| RC 2911 | — | — | — | — | 0.76 |
| Base 10 SE | — | — | — | 0.80 | — |
| Sulphurized $C_{14}$-$C_{18}$ olefin | — | — | 0.44 | — | — |
| VL 7723 | — | 0.23 | — | — | — |
| Base stock | balance | balance | balance | balance | balance |
| mmol salicylate soap | 6.12 | 6.12 | 6.12 | 6.12 | 6.12 |
| Phosphorus ppm (ASTM D5185) | 800 | 800 | 800 | 800 | 800 |

TABLE 2

|  | Example 5 | Example 6 | Example 7 | Example 8 | Example 9 |
|---|---|---|---|---|---|
| TEOST 33C | 45.3 | 48.0 | 35.0 | 27.7 | 24.6 |

The results demonstrate that in the absence of a sulphurized fatty acid ester a lubricating oil composition including an overbased calcium salicylate detergent fails the TEOST 33C test (Comparative Example 5). The inclusion of an ashless dithiocarbamate (Comparative Example 6) or a sulfurized $C_{14}$-$C_{18}$ olefin (Comparative Example 7) as an additional sulphur containing compound in the lubricant of Example 5 does not enable the resulting lubricating oil compositions comprising an overbased calcium salicylate detergent to pass the TEOST 33C test. In order to pass the TEOST 33C test, a lubricating oil composition including a calcium salicylate detergent must include a sulfurized fatty acid ester (compare Inventive Examples 8 and 9 with Comparative Example 5).

What is claimed is:

1. A lubricating oil composition having a TBN of from about 5 to about 12 mg KOH/g, which comprises or is made by admixing:
   (A) an oil of lubricating viscosity, in a major amount;
   (B) one or more oil-soluble or oil-dispersible sulfurized fatty acid ester(s) selected from sulfurized $C_5$ to $C_{29}$ aliphatic hydrocarbyl fatty acid alkyl ester derived from sulfurizing palm oil, corn oil, grapeseed oil, coconut oil, cottonseed oil, wheatgerm oil, soya oil, safflower oil, olive oil, peanut oil, rapeseed oil, sunflower oil, or a trans-esterified product thereof, or a combination thereof and having a sulphur content of from 5 to 20 mass %, as an additive in an amount providing the lubricating oil composition with from about 0.08 mass % to about 0.25 mass % sulphur; and,
   (C) one or more oil-soluble or oil-dispersible alkali metal or alkaline earth metal salicylate detergent(s) having a TBN at 100% active mass of from about 150 mg KOH/g to about 500 mg KOH/g, as an additive in an effective minor amount, providing from about 5.0 to about 15 mmol of salicylate soap per kilogram of the lubricating oil composition,
wherein the lubricating oil composition does not comprise a phosphorus ester additive.

2. A composition as claimed in claim 1, wherein the one or more oil-soluble or oil-dispersible alkali metal or alkaline earth metal salicylate detergent(s) is the only metal detergent present in the lubricating oil composition.

3. A composition as claimed in claim 1, wherein the lubricating oil composition further includes an ashless aminic anti-oxidant, an ashless phenolic anti-oxidant, or a combination thereof, as an additive in an effective minor amount.

4. A composition as claimed in claim 1, wherein the lubricating oil composition further includes an oil-soluble or oil-dispersible organo-molybdenum compound, as an additive in an effective minor amount.

5. A composition as claimed in claim 1, wherein the lubricating oil composition further includes at least one oil-soluble or oil-dispersible dihydrocarbyl dithiophosphate metal salt, as an additive in an effective minor amount.

6. A composition as claimed in claim 1, wherein the lubricating oil composition further includes at least one borated dispersant, as an additive in an amount to provide from 2 to 1200 ppm boron to the composition.

7. A method of lubricating a spark-ignited or compression-ignited internal combustion engine comprising lubricating the engine with a lubricating oil composition as claimed in claim 1.

* * * * *